United States Patent [19]

Varnum et al.

[11] 4,198,676

[45] Apr. 15, 1980

[54] GENERAL PURPOSE ELECTRONIC THERMOMETER HAVING SELECTIVE DATA RECOVERY, DATA CONVERSION, AND DATA DERIVATION CAPABILITIES

[76] Inventors: Tracy L. Varnum, P.O. Box 682, Fort Bragg, Calif. 95437; Robert L. Livezey, Jr., P.O. Box 98, Caspar, Calif. 95420

[21] Appl. No.: 971,370

[22] Filed: Dec. 20, 1978

[51] Int. Cl.² .............................................. G01K 7/14
[52] U.S. Cl. ................................ 364/557; 73/362 AR
[58] Field of Search ............. 364/557; 73/339 R, 342, 73/362 AR, 362 SC; 340/347 M

[56] References Cited

U.S. PATENT DOCUMENTS

| | | | |
|---|---|---|---|
| 3,906,796 | 9/1975 | Dumbeck | 73/362 AR |
| 3,982,110 | 9/1976 | Kawai | 364/557 X |
| 4,030,363 | 6/1977 | Halleck | 73/362 AR |
| 4,060,715 | 11/1977 | Scott | 364/557 |
| 4,068,138 | 1/1978 | Miyakawa et al. | 73/362 AR X |
| 4,068,526 | 1/1978 | Goldstein | 73/362 AR |
| 4,114,442 | 9/1978 | Pratt | 364/557 X |
| 4,122,719 | 10/1978 | Carlson et al. | 364/557 X |

*Primary Examiner*—Edward J. Wise

[57] ABSTRACT

An improved general purpose electronic thermometer comprising a platinum resistance sensor, a constant current source which impresses a current through said sensor, an amplifier which amplifies the voltage which results from the impressing of said current through said sensor—the resistance of which varies with temperature, an analog to digital converter which digitizes the signal from said amplifier and supplies the result to a microcomputer, said microcomputer which corrects for non-linearities in the resistance versus temperature relationship of the sensor using a ROM look-up table of corrections and an interpolation algorithm, and which outputs to a display either:

the resulting temperature equivalent,
a calculated rate of temperature change,
a temperature equivalent representing the extreme of a temperature curve, defined as the temperature farthest removed from a determined initial temperature and in the direction of a determined initial significant change, derived by calculations and comparisons between consecutive temperature measurements, or a temperature equivalent representing either the minimum or the maximum temperature measured from the time power is applied to the instrument until the time of such output, depending upon user selectable inputs.

Any of the aforementioned data may be output to the display in forms representing degrees Celsius, degrees Fahrenheit, or degrees Kelvin depending upon user scale selection and input.

The number of bits of information resolved by the analog to digital converter is increased by means of offset circuitry which applies a predetermined voltage to the amplifier, resulting in a differential in the signal to and the digitized data from the analog to digital converter, which data is then interpreted by the microcomputer as including a temperature differential. Application and withdrawal of this offset voltage is under microcomputer control.

Hand-held size, achieved by utilization of a single-chip microcomputer, enhances the usefulness of the instrument.

1 Claim, 11 Drawing Figures

GENERAL PURPOSE ELECTRONIC THERMOMETER HAVING SELECTIVE DATA RECOVERY, DATA CONVERSION, AND DATA DERIVATION CAPABILITIES

BACKGROUND AND SUMMARY OF THE INVENTION

This invention relates generally to thermometers and improvements therein and more particularly to electronic thermometers which perform calculations or similar operations upon temperature data.

While some prior art electronic thermometers are capable of performing limited data conversions such as conversions from one temperature scale to another; while some conventional electronic thermometers allow for limited data storage and recovery such as maximum or minimum temperatures; and while certain conventional electronic thermometers have capabilities of limited data derivation such as detecting and holding in a display a temperature curve peak, none known to the inventors of the device described herein have achieved incorporation of all these capabilities in enhanced forms into a single-unit general purpose instrument.

Conventional thermometers which have selective data conversion functions either limit such conversion to two switch selectable scales or require internal hardware alterations or adjustments to achieve selection of an alternative scale.

Prior art thermometers which incorporate data recovery and derivation features fall into one of the two following categories:
- instruments which must be interfaced with ancillary equipment, either data collecting devices or data processing equipment, in order to achieve such capabilities,
- instruments with minimal data recovery or data derivation capabilities.

Devices in the former category result in elaborate and expensive thermometric systems which require sophistication on the part of the user. In addition, these instruments pose portability problems due to the bulk of such systems and are therefore unsuitable for general use. Devices in the latter category also have restricted application due to the limits of their capabilities—limits which dictate that the user make many necessary observations, comparisons, or computations in order to derive or collect commonly useful or required information. Such a requirement is wasteful of the human resource and often results in lost data due to the inability of the user to monitor the device at all times or to perform the necessary comparisons or computations in the required time or with the required accuracy.

Prior art digital electronic thermometers must either make trade-offs between precision of temperature resolution and width of range—such trade-off being necessitated by the limits of the number of bits of resolution of the analog to digital converter used, or they must employ more sophisticated analog to digital converters the result of which is more expensive and generally less portable instruments.

The primary object of the invention described herein is to provide an electronic thermometer having improved selective data recovery, data conversion, and data derivation capabilities in an embodiment that is less expensive, more portable, more efficient, and easier for the untrained user to operate than conventional thermometric data collection and processing systems.

It is a further object of this invention to embody the above in a device incorporating high accuracy and high resolution over a wide range of measurable temperatures.

Other objects and advantages of this invention will be recognized from the following description including the specifications, claims, and drawings in which:

Figure 5A:
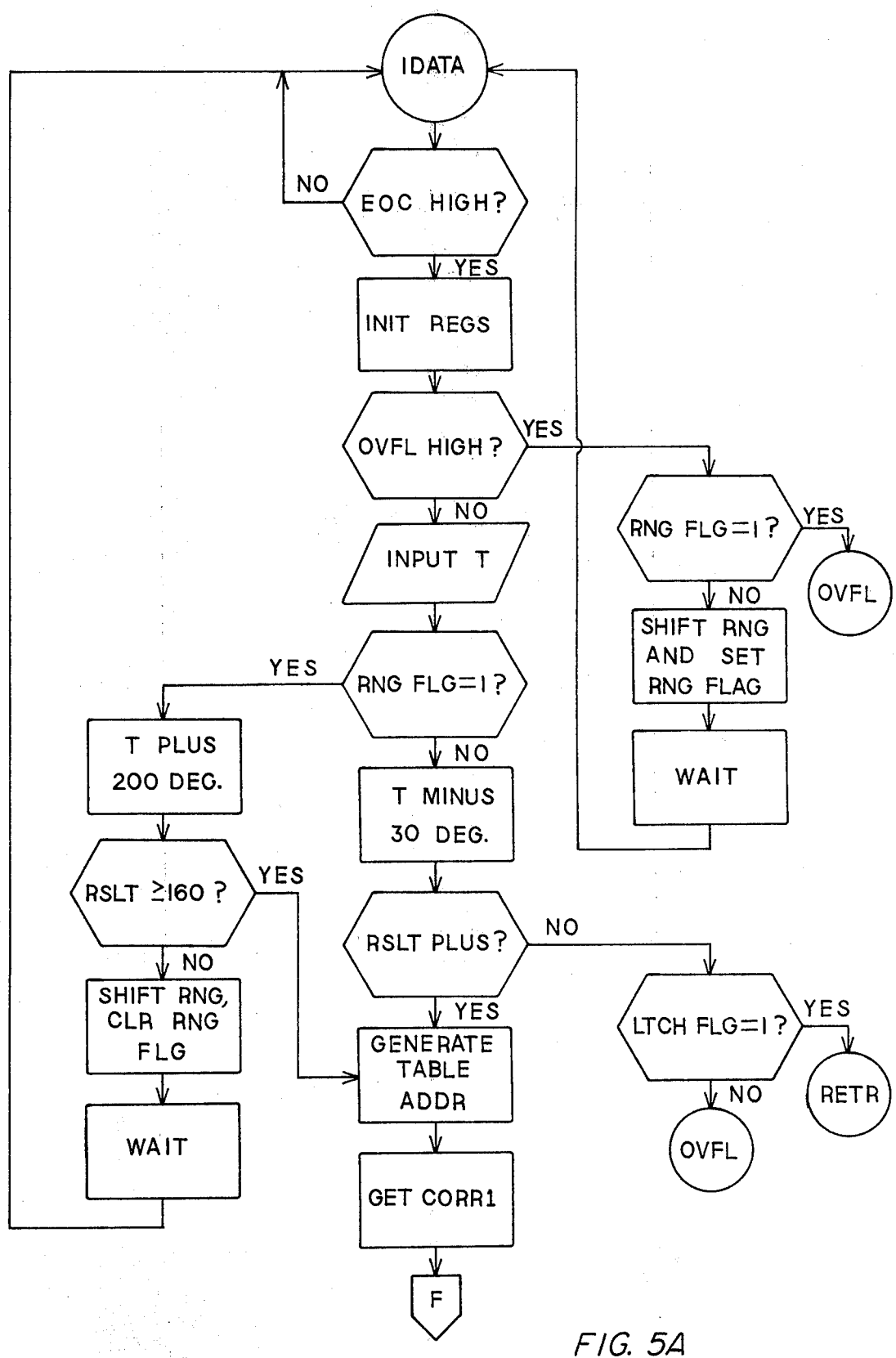
Figure 5B:
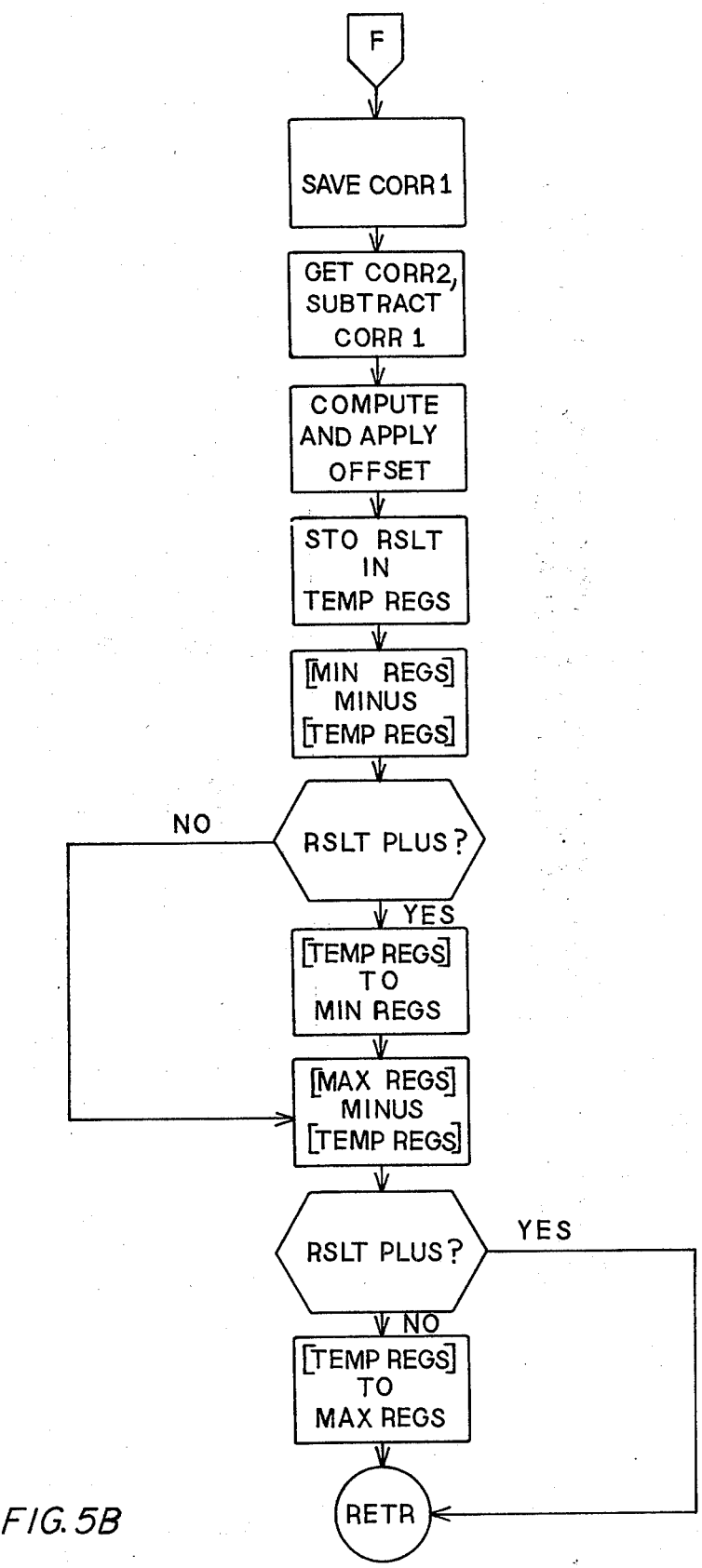

FIGS. 5A-B are a flow chart of an input routine comprising the routine to input data from the analog to digital converter to the microcomputer, correct the data, and update the MIN and MAX registers if appropriate.

Figure 6A:
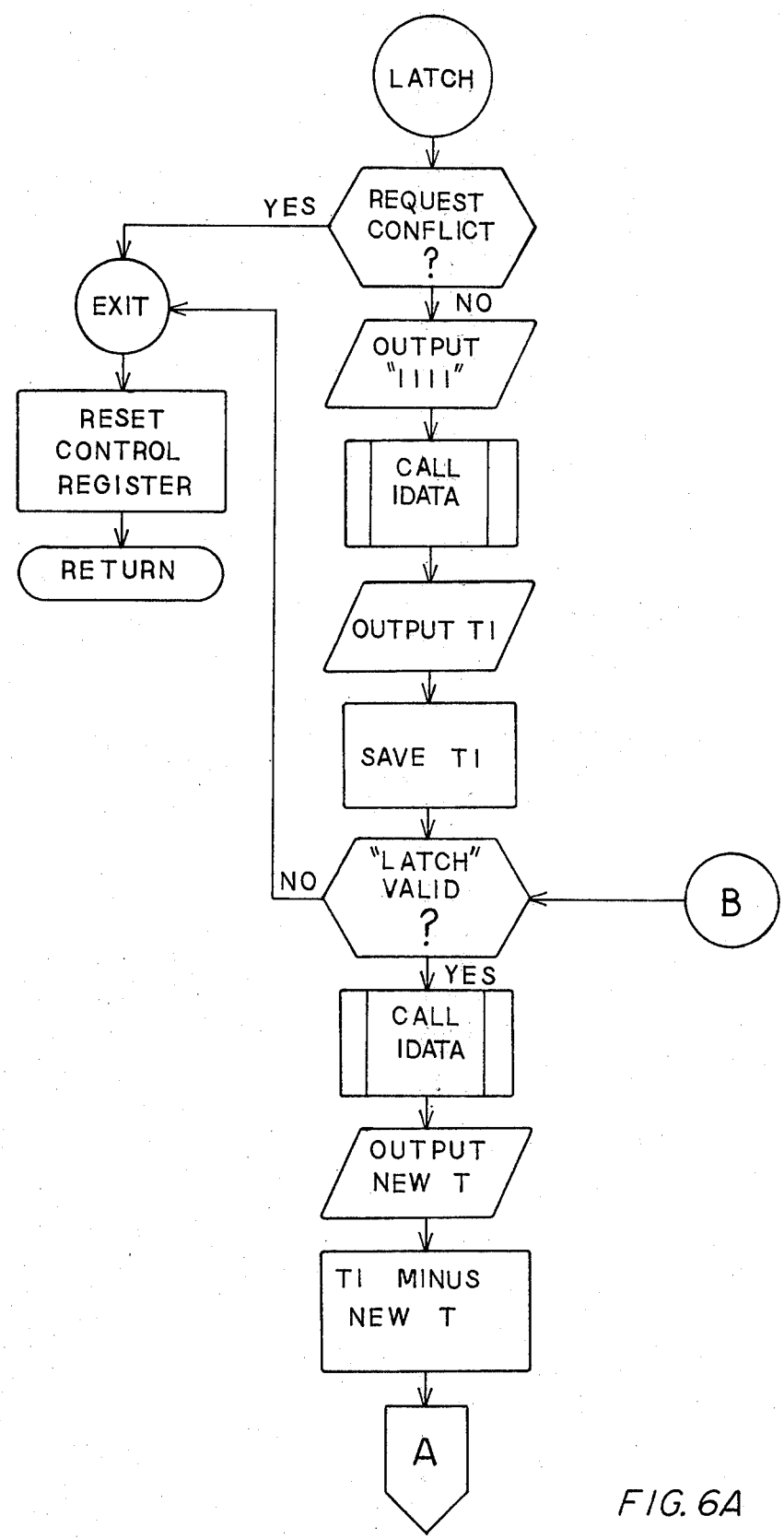
Figure 6B:
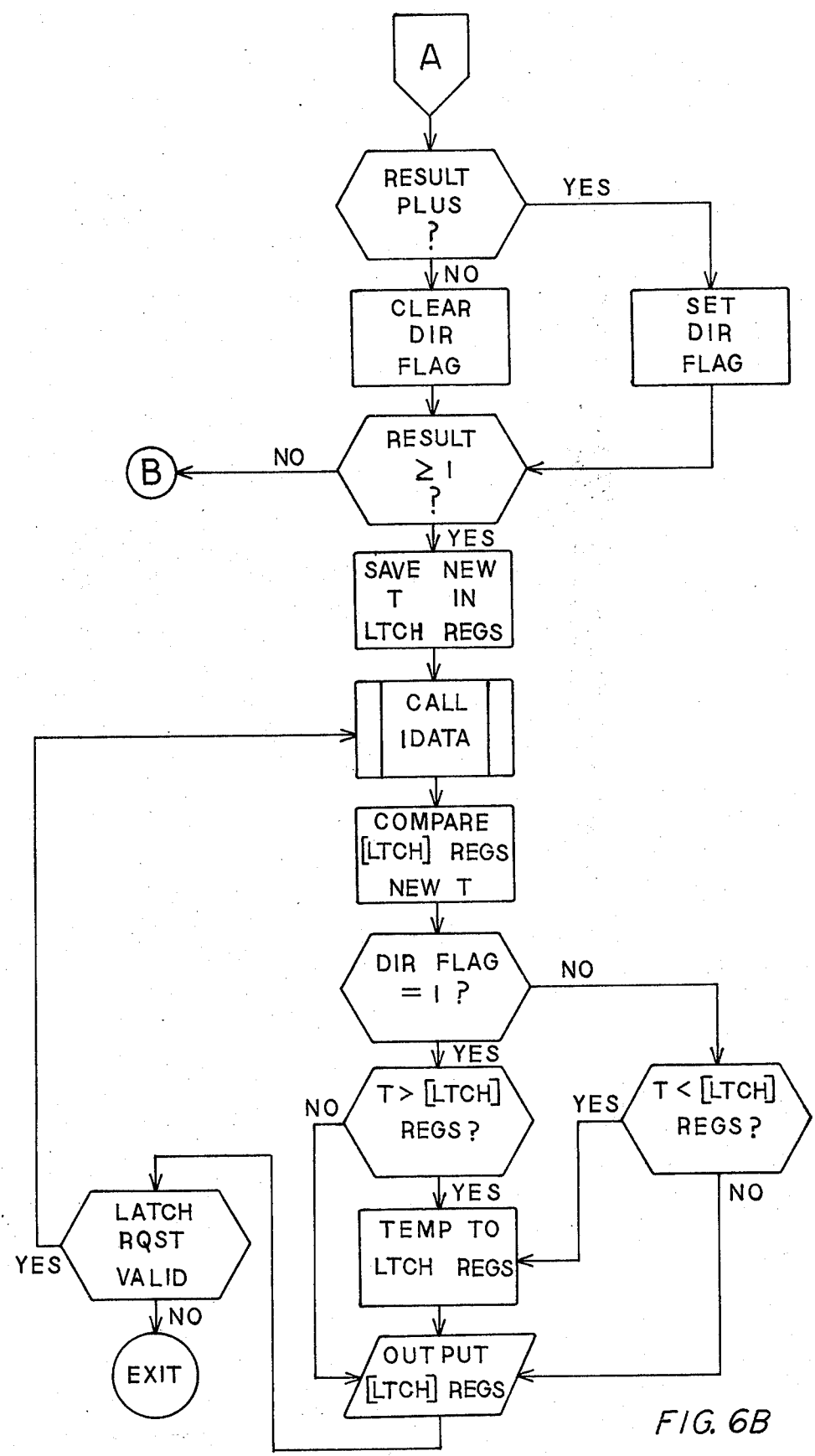

FIGS. 6A-B are a flow chart of a routine comprising the routine determining the Latch operational mode.

Figure 7A:
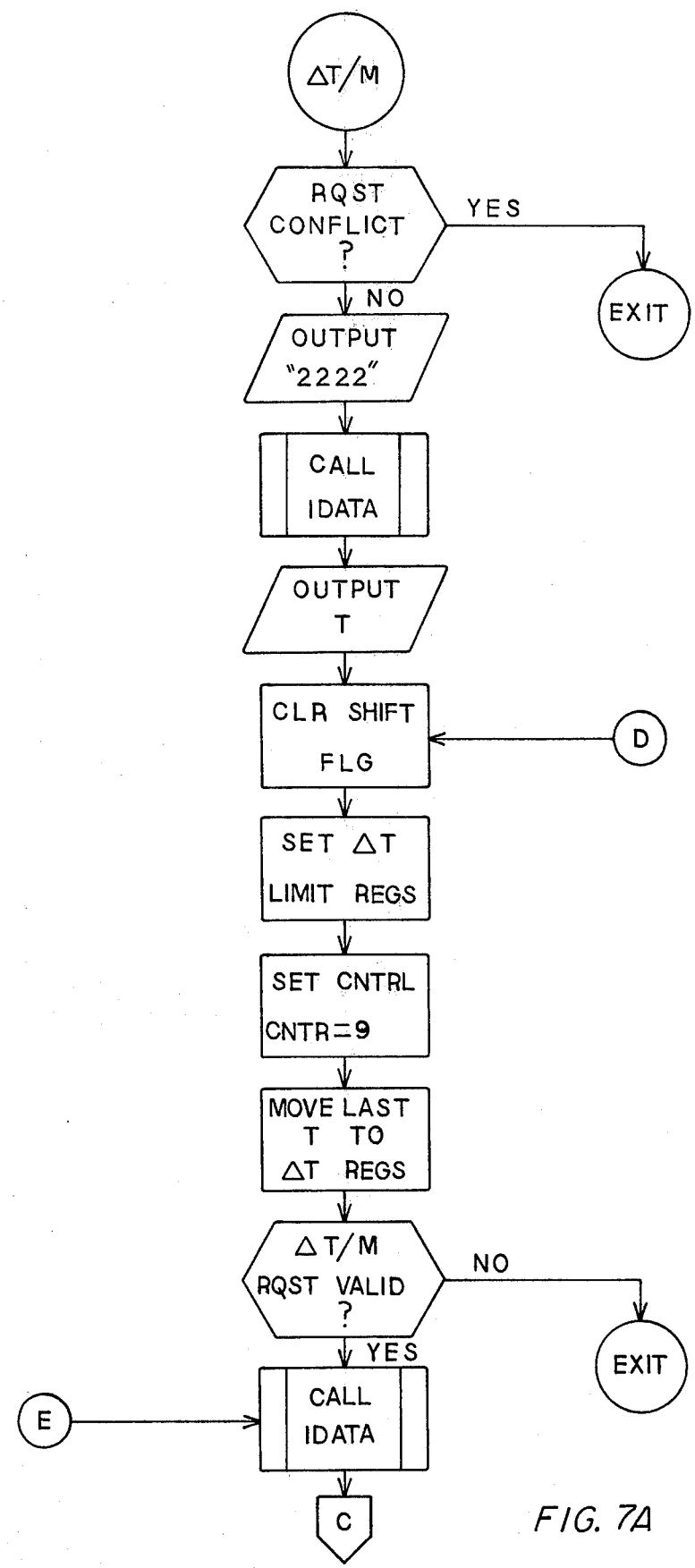
Figure 7B:
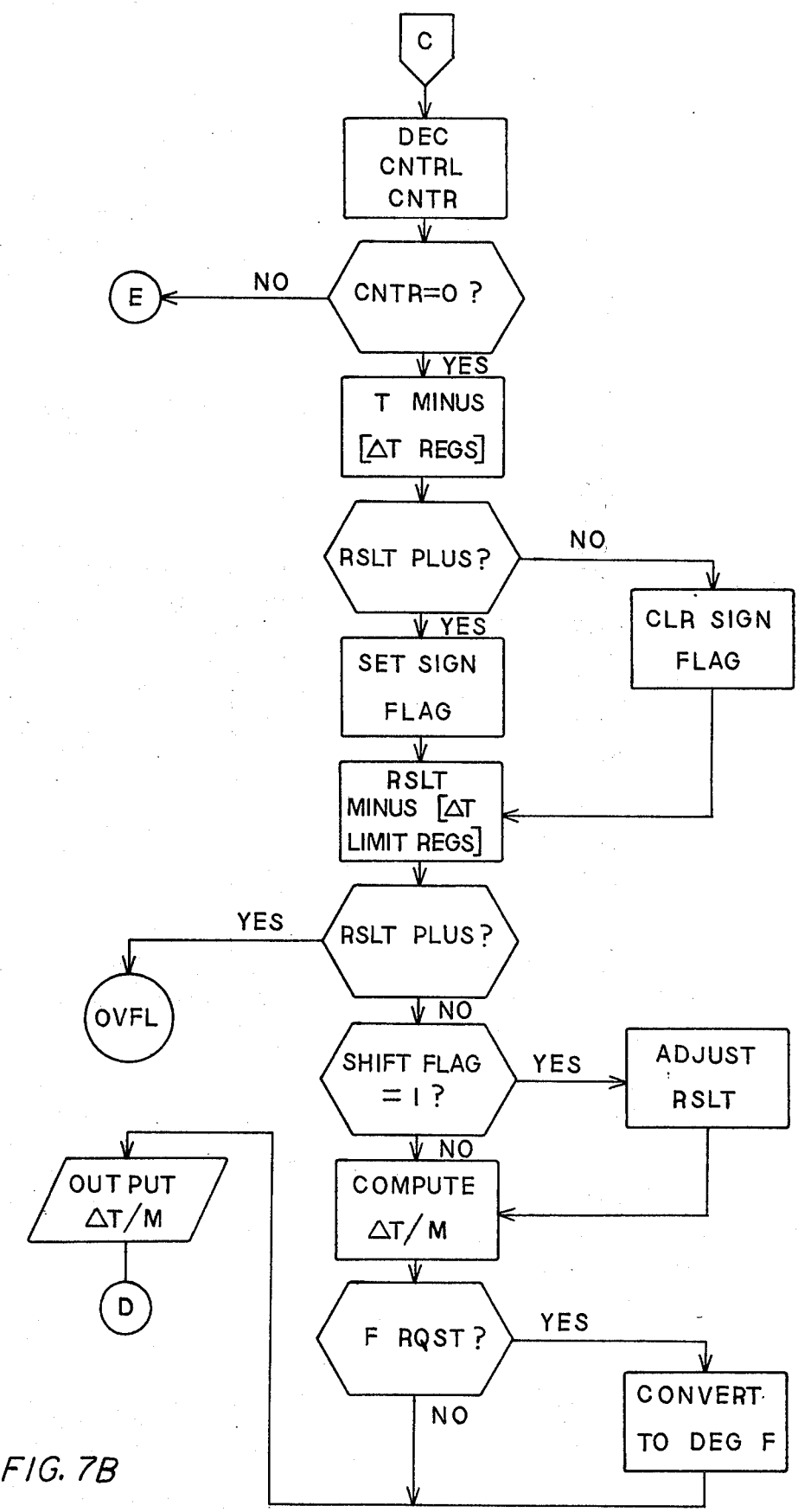

FIGS. 7A-B are a flow chart of a routine comprising the routine determining the Delta T/M operational mode.

Figure 8:
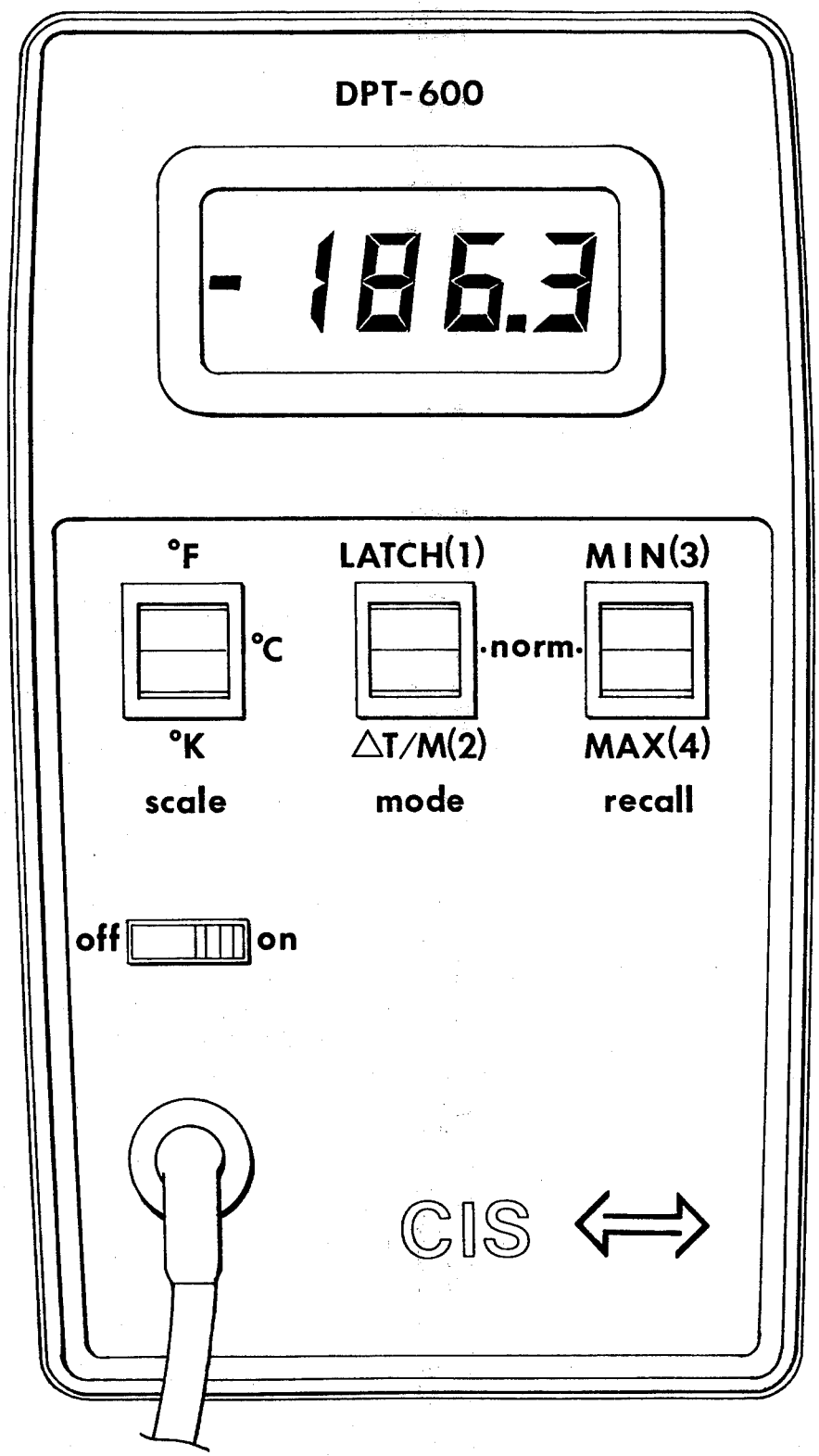

FIG. 8 is a front view of an electronic thermometer according to the preferred embodiment of the invention.

DESCRIPTION OF THE PREFERRED EMBODIMENT

Figure 1:
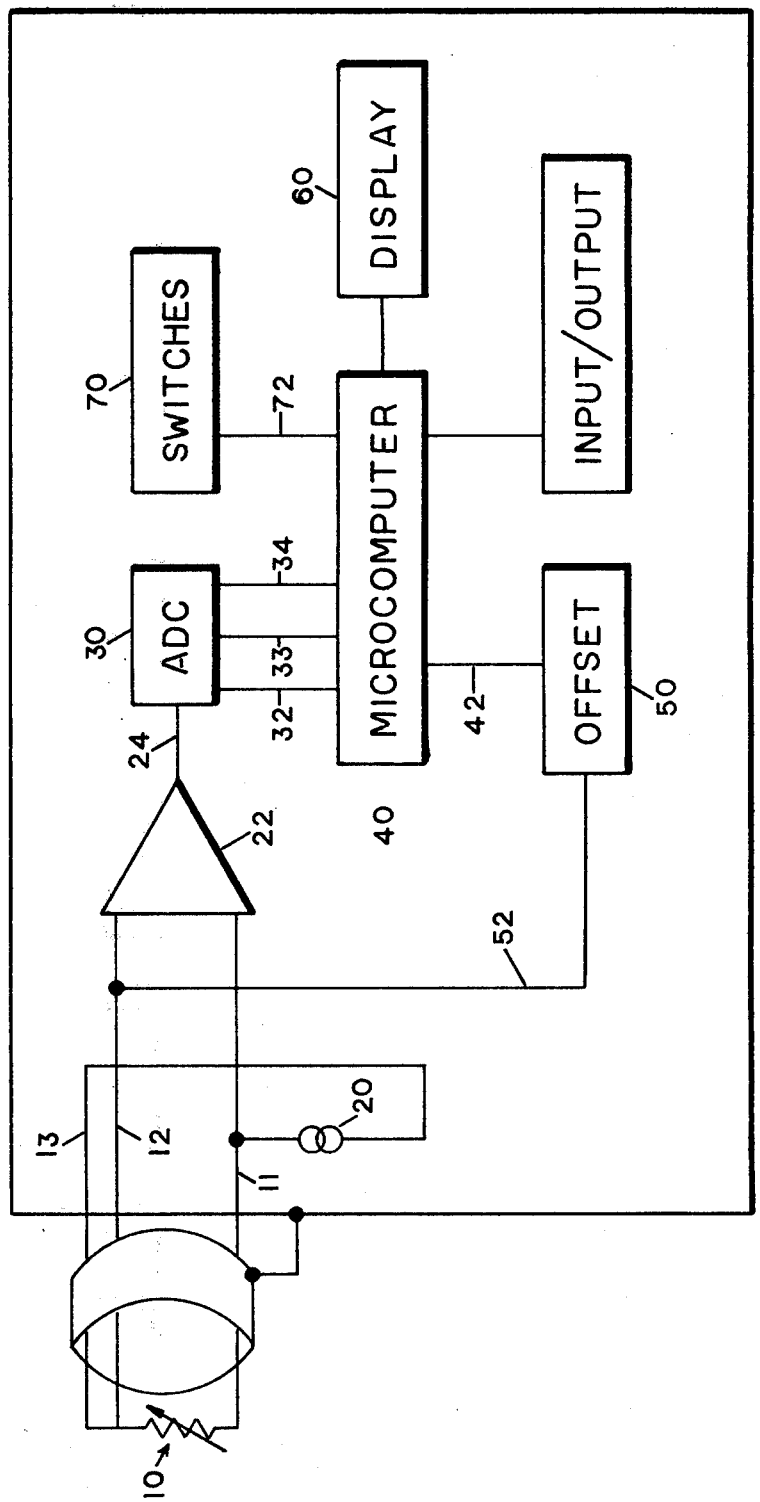
FIG. 1 is a block diagram of the present embodiment.

Referring now to FIG. 1, in the preferred embodiment, there is provided a platinum resistance sensor 10, provided with three wires 11, 12, and 13, two wires 11 and 13 being connected to a source of constant current 20, and two wires 11 and 12 being connected to an amplifier 22. The constant current source impresses a current through the sensor, the resistance of which varies in a predictable way with temperature. The resultant voltage at the sensor is transmitted to the amplifier through lines 11 and 12. The analog signal from the amplifier is carried through line 24 to a twelve-bit analog to digital converter (ADC) 30, which digitizes the signal. This digital data is presented to the microcomputer (MC) 40 through the four-bit bus 32 in the form of a sequence of binary-coded decimal (BCD) digits in response to control signals sent to the ADC by the MC through line 33.

The MC is programmed with an algorithm by which it converts the input from the ADC into a corrected BCD representation of degrees Celsius (°C.). Correction of this data—necessary due to inherent non-linearities in the variance of the resistance of the sensor with respect to temperature—is achieved by means of a table of corrections stored in the ROM of the MC. A value is stored for each ten degree C. increment of the range of the instrument and in the form of signed BCD numbers. Corrections for intermediate values are calculated by an interpolation algorithm stored in the MC's ROM. This corrected data and all other information output by the MC is displayed by means of a conventional liquid crystal display (LXD) 60.

In the present embodiment, the full-span conversion range of the ADC represents approximately four hundred °C. with a resolution of 0.1° C. Extension of this range to a span of approximately six hundred °C., with the same resolution, is effected in the following manner:

referring again to FIG. 1, upon overflow, the ADC outputs to the MC an OVF signal on line 34; the MC is programmed with an algorithm by which it then sends out on line 42 a signal to the offset circuitry 50 which offsets the amplifier by inputing a voltage to the amplifier on line 52. This voltage is representative of a two hundred degrees C. subtraction. The MC is provided with an algorithm which adds this offset back to data incoming from the ADC while this offset is applied—i.e., whenever this range shift is in effect. Should this addition result in data representative of less than one hundred sixty degrees C., the MC outputs a signal to the offset circuitry to remove the offset voltage. In the event of a second OVF signal from the ADC while the offset voltage is applied, the MC responds with a routine to output a true instrument overflow indication.

All temperature data output by the MC is output in either of three temperature scales—Celsius, Fahrenheit, or Kelvin—which are user selected by means of the request switches 70 of FIG. 1 which input signals to the MC through line 72. These request switches also allow the user to select any of the following operating modes or functions:

CONTINUOUS MODE: in this mode the MC inputs each conversion from the ADC, corrects the data, and outputs to the display the result approximately 1.5 times per second. Data output represents actual temperature at the sensor. In this mode the instrument functions as a thermometer.

LATCH MODE: in this mode the MC controls the following operational sequence:
(1) output to the display an acknowledgement of the request for the mode,
(2) output the initial temperature T1 recorded upon entry into the mode and save T1 for future comparisons,
(3) input each successive conversion from the ADC, output the corrected data to the display, then compare the data to T1 testing for a significant temperature change, defined in the present embodiment as greater than or equal to plus or minus 1.0° C.; if there is no significant change, continue this process, once a significant change is detected the direction of that change is noted (plus or minus),
(4) test each successive conversion from the ADC and output to the display only those temperature equivalents which represent temperatures farther removed from T1 in the direction of the previously noted significant change than the last output to the display.

In this mode, the instrument seeks the extreme of a temperature curve, and once it is detected, holds that data in the display until the mode is deselected by the user.

DELTA T/M MODE (rate of change in temperature per minute mode): in this mode the MC controls the following operational sequence:
(1) output to the display an acknowledgement of the request for the mode,
(2) output the initial temperature T1 recorded upon entry into the mode and save T1 for future calculations,
(3) from this point on, input each conversion of the ADC, correct the data input, do not output the result to the display; rather, every six seconds compare the input and corrected data to the temperature recorded at the beginning of that six second interval, calculate the relative change in temperature at the sensor during that interval, calculate from this result the relative change in temperature per minute represented by that change, and output the result to the display.

In this mode the instrument provides data concerning the relative slope of a temperature curve.

MIN RCL and MAX RCL FUNCTIONS: in all three of the aforementioned modes each input from the ADC is corrected by the MC and then compared to the temperature data stored in certain RAM registers of the MC. Data representing either a new absolute minimum or maximum recorded temperature is stored in the appropriate MIN or MAX registers, replacing any earlier stored values. At the time the instrument is powered up those registers are loaded with values which insure that the first recorded temperature will be stored in both sets of registers; therefore, at any time after power is applied the data stored in those registers represents the absolute minimum and maximum recorded temperatures.

At any time, the user can select to recall the values stored in either the MIN or the MAX registers. Selection of either function results in the following MC controlled operational sequence:
(1) output to the display an indication of which data will be recalled,
(2) output to the display the data from the appropriate registers,
(3) input each successive conversion from the ADC, correct the data, and compare the result to the data in the MIN and MAX registers, update registers where appropriate, and after each such input and comparison, again output to the display the data from the requested registers.

These functions provide the instrument with the capability of data storage and selective data recovery.

DETAILED DESCRIPTION OF CIRCUIT OPERATION

Figure 2:
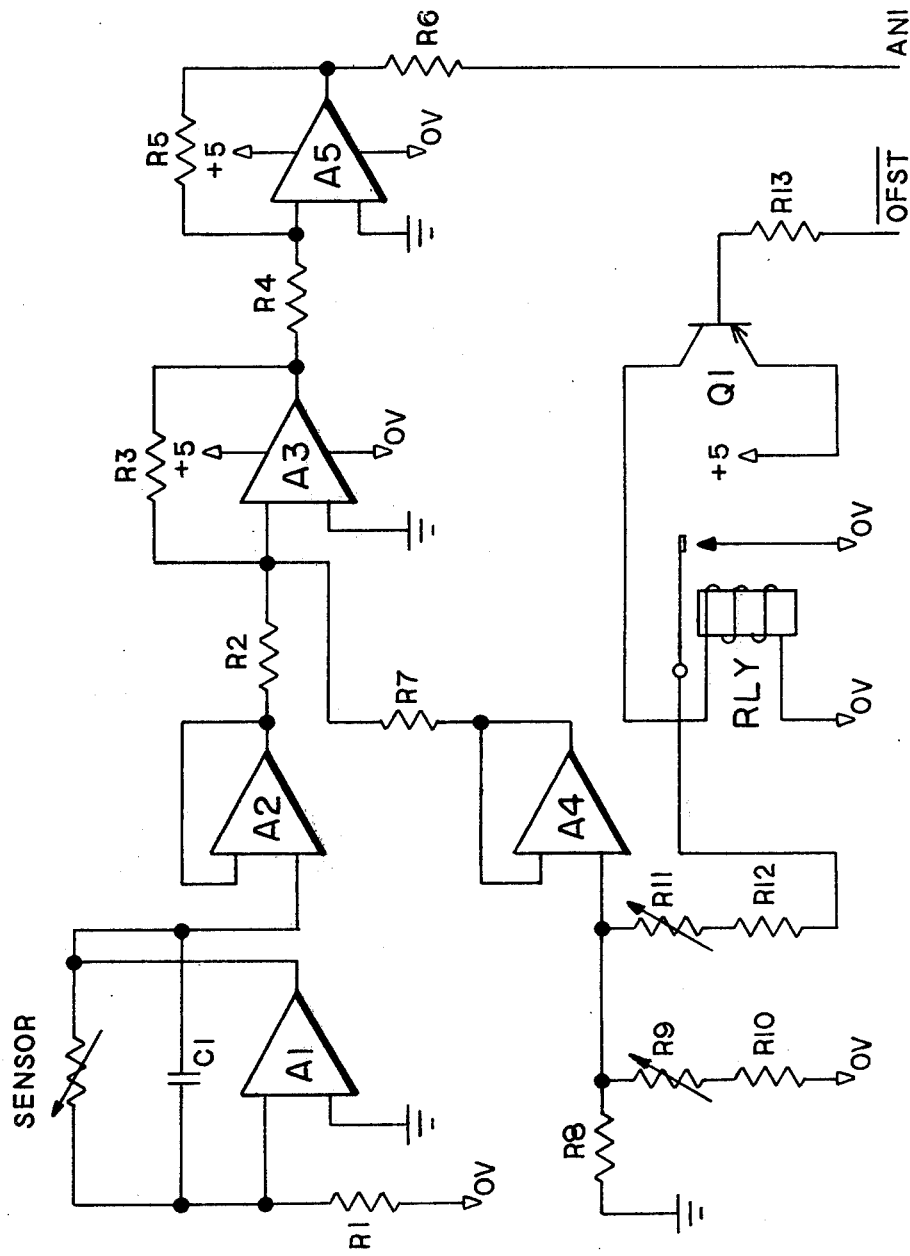
FIG. 2 is a circuit diagram of the amplifier and offset circuitry.

Referring now to FIG. 2, operational amplifier A1, configured as a constant current source, maintains a constant current I through the sensor, resulting in a voltage $V_S$ across the sensor. The magnitude of $V_S$ is dependent upon the resistance R of the sensor, R being a function of the temperature of the sensor. The relationship among $V_S$, I, and R is given in the equation $$V_S = I \cdot R$$

(Equation 1)

The relationship between the resistance and temperature of the sensor is given by the well-known equation which takes the following general form:

$$R_T = R_O(1 + A \cdot T + B \cdot T^2)$$

(Equation 2)

wherein:
T is the temperature in degree Celsius;
$R_T$ is the resistance of the sensor at temperature T;
$R_O$ is the resistance of the sensor at zero degrees Celsius;
A is $3.90784 \times 10^{-3}$;
B is $-0.578408 \times 10^{-6}$.

The aforementioned voltage $V_S$ is impressed through buffer A2 to the amplifying circuitry comprising operational amplifiers A3 and A5 together with resistors R2, R3, R4, R5, and R7. Also impressed to the amplifying circuitry along with $V_S$ is the zero-set nulling voltage $V_Z$ which is determined by the voltage divider comprising resistors R8, R9, and R10 and which is supplied through the buffer A4. The function of $V_Z$ is to null a portion $V_S$ in order to set the zero point of the circuitry during calibration. The operation of the amplifying circuitry is best described by the following equation:

$$V_O = -((V_S/R2 + V_Z/R7) \cdot R3) \cdot -(R5/R4)$$

(Equation 3)

wherein;
$V_O$ is the final amplified voltage output from A5
$V_S$ is the voltage from the sensor
$V_Z$ is the zero-set nulling voltage
R2, R3, R4, R5, and R7 are resistors having the values given in TABLE I (page 33).

Figure 3:
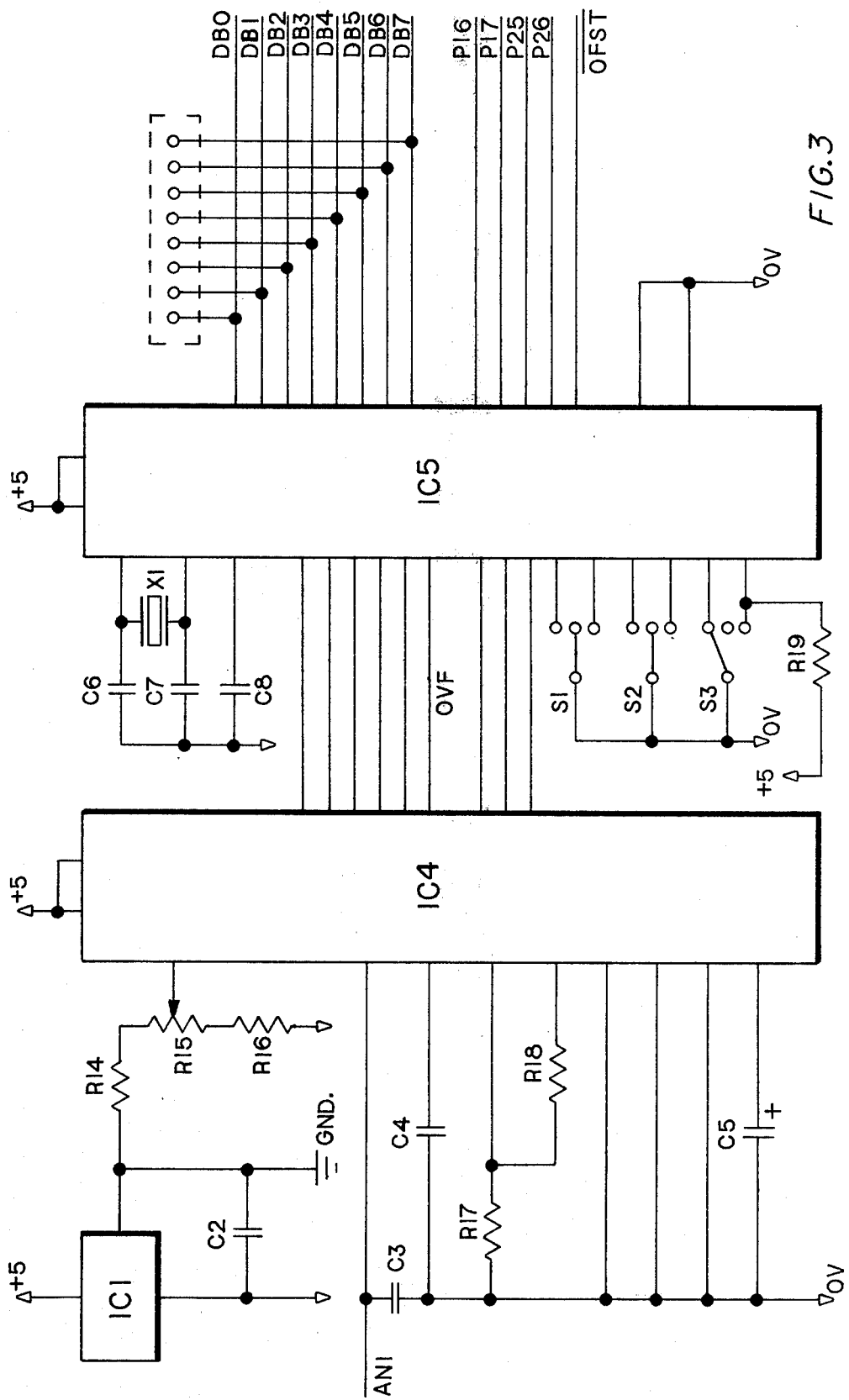
FIG. 3 is a circuit diagram of the analog to digital converter and microcomputer circuitry.

$V_O$ (which is an analog representation of the temperature of the sensor) is applied through the current-limiting resistor R6 to the input ANI of the twelve-bit analog to digital converter IC4 of FIG. 3.

Referring now to FIG. 3, IC4, in conjunction with the required capacitors C3, C4, and C5 and the resistors R17 and R18, functions as an analog to digital converter which compares the unknown analog input $V_O$ at ANI to a known reference voltage generated by the voltage reference IC1 and the voltage divider network comprising resistors R14, R15, and R16, the values of which are given in TABLE II (page 33). The result of this comparison is a twelve-bit digital representation of the magnitude of $V_O$. This digital data is output to the microcomputer IC5 as four consecutive binary coded decimal (BCD) digits upon requests received from and generated by IC5. IC5, under control of the switches S1, S2, and S3, utilizes this BCD data to generate data appropriate to user requests. For a complete description of the operation of IC5 in this respect see the descriptions and listing of the software routines given in later sections.

Capacitors C6 and C7 together with the crystal X1 in conjunction with IC5 provide the system clock. Capacitor C8 serves as a power-on reset for IC5.

Besides generating data to be output to the display, as described later, IC5 to also interacts with the analog circuitry to effectively increase the application range of that circuitry in the following manner: referring again to FIG. 3, when the voltage $V_O$ at ANI exceeds the conversion capabilities of IC4, IC4 generates and outputs to IC5 an overflow signal on the line OVF. Upon each input of BCD data from IC4, IC5 tests OVF for this signal. If this signal is present, the BCD data is considered invalid by IC5 which responds as follows: IC5 either (1) outputs a signal on $\overline{OFST}$ which results in an offset of the analog circuitry equivalent to the subtraction of 200° C. from the analog signal, and resumes accepting data from IC4, adding the "subtraction" back each time;

or (2) outputs an overflow indication to the display LXD if the analog circuitry already has this offset applied to it.

The aforementioned offset is achieved as follows: referring again to FIG. 2, $\overline{OFST}$ is pulled low (logical "0") by IC5, which causes the transistor Q1 to actuate the relay RLY which connects the resistance determined by resistors R11 and R12 in parallel with the zero-set resistance determined by resistors R9 and R10. The result is that $V_Z$ is changed to a new value sufficient to offset the circuitry by an amount equal to a drop of 200° C. at the sensor.

The offset, once applied, is not withdrawn by IC5 until the BCD data input from IC4 represents a temperature less than 160° C.

Figure 4:
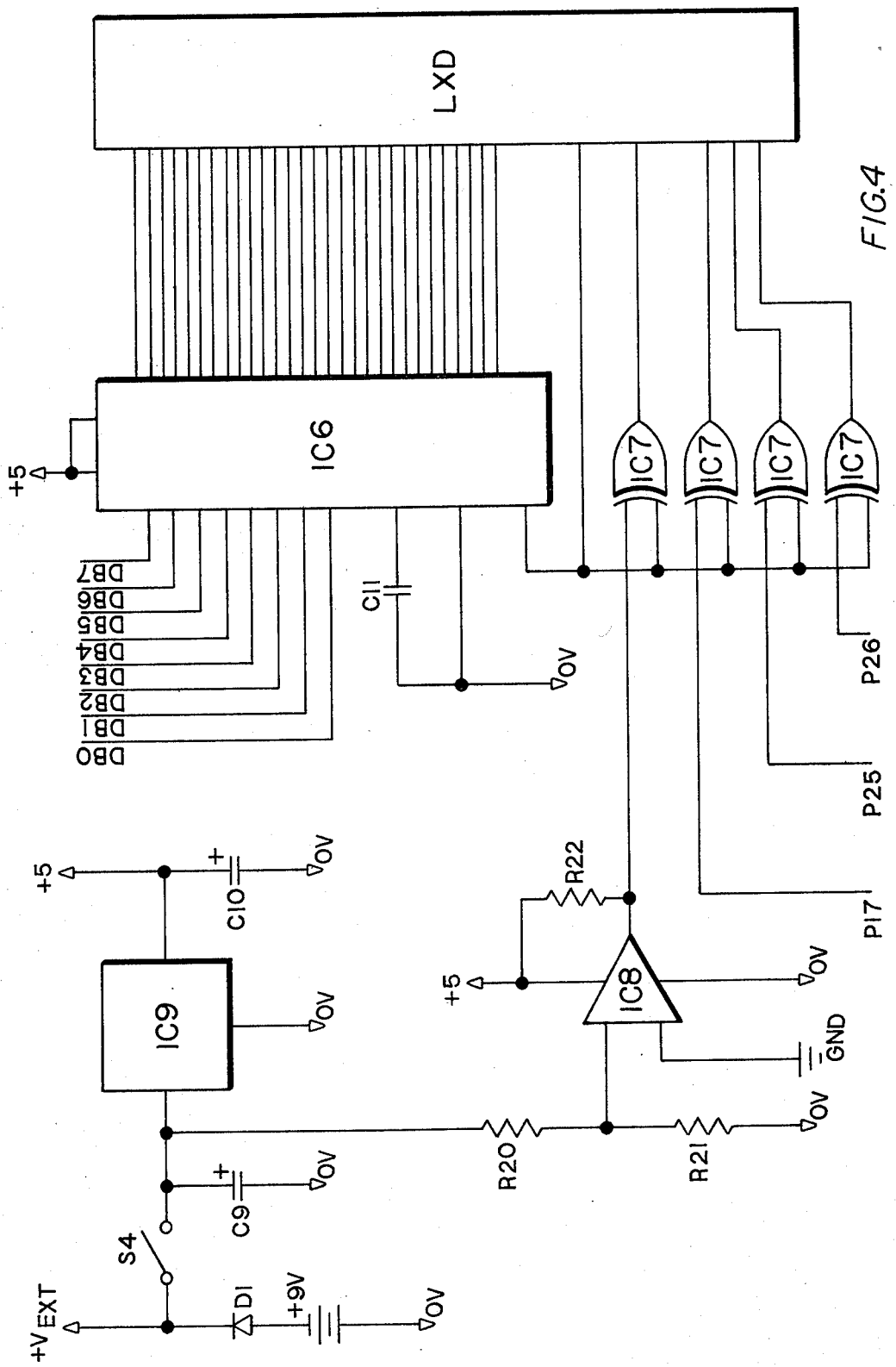
FIG. 4 is a circuit diagram of the display and ancillary circuitry.

Referring now to FIG. 4, data ouput by IC5 of FIG. 3 to the display LXD is sent first to the display driver IC6 via the lines DB0-DB7, in the form of BCD digits together with appropriate digit select signals. IC6 coverts this data to the seven-segment, four-digit format required by the display.

IC9 regulates the voltage supplied to the entire circuitry. IC8 is a comparator which tests for a low-battery condition by comparing the voltage determined by the voltage input to IC9 through switch S4 and the voltage divider comprising resistors R20 and R21 (which voltage is dependent upon the state of the battery) to a reference voltage established by the voltage reference IC1 of FIG. 3 (this reference voltage is used to establish ground GND for the analog circuitry). Once the compared voltage drops below the reference voltage, the output of IC8 goes high (logical "1") and via the exclusive OR gate IC7 drives a low-battery indication on the display. The remaining gates on IC7 are used to drive the decimal point, minus sign, and most significant digit (which is a "1") of the display under control of IC5 of FIG. 3 via lines P17, P25, and P26.

FIRMWARE

Operation of the firmware will be best understood by reference to the complete listing of the routines and subroutines of instructions to follow, the flow charts of specific routines presented in FIGS. 5A-7B, and the published literature associated with the Intel 8048 microcomputer.

Referring now to FIG. 5, the following is a description of the operational steps of the subroutine IDATA by which data is input from the analog to digital converter (ADC) to the microcomputer (MC).

First the MC waits for the end-of-conversion signal (EOC) from the ADC (step labelled "EOC HIGH?"). Once this signal is received, the working register banks are set to appropriate initial values ("INIT REGS"). Next, the OVFL signal from the ADC is checked ("OVFL HIGH?"). If this signal is high (logical "1"), then the ADC has reached the top of its operating range. In such circumstances the MC tests its own range flag ("RNG FLG=1?") which, when set to "1", indicates that the analog circuit has already been offset, in which case the OVFL signal from the ADC represents a true instrument overflow. In this case, the MC enters a routine which outputs an overflow signal to the display ("OVFL"). If the range flag is not high, then the MC outputs a signal to the relay and offset circuitry to apply an offset to the analog circuitry representative of a 200° C. subtraction from the signal input to the ADC, and sets the aforementioned range flag to "1" ("SHIFT RNG AND SET RNG FLAG"). The MC then executes a wait loop to allow time for new data to be input to the now offset analog circuit ("WAIT"). After this wait, the MC re-enters IDATA at the beginning.

Returning now to the step labelled "OVFL HIGH?", if this signal is not high, then the MC proceeds to input the temperature data from the ADC ("INPUT T"). Next the MC checks the aforementioned range flag in order to determine whether the equivalent of 200° C. must be added to the input data ("RNG FLG" 1?"). If the range flag is high, then the MC performs the addition ("T PLUS 200 DEG."). The result is checked as to whether it represents a temperature greater than or equal to 160° C. ("RSLT≧160?"). If not, the MC withdraws the offset from the analog circuit by withdrawing its signal to the relay, and clears its range flag to indicate that the offset is no longer applied ("SHIFT RNG, CLR RNG FLG"). After executing a wait loop ("WAIT") in order to allow new "non-offset" data to be input to the ADC, the MC re-enters IDATA at the beginning. If the result of the aforementioned addition does represent a temperature equal to or greater than 160° C., the MC proceeds to generate a look-up table address as described later ("GENERATE TABLE ADDR").

Returning now to the step labelled "RNG FLG = 1?", if the range flag is not "1", the MC subtracts the equivalent of 30° C. from the input data ("T MINUS 30 DEG."). This represents an unused portion of the ADC's conversion range at the bottom of that range. Since the ADC is not adequately linear in this portion of its operation, its entire operation is essentially offset by this amount. The result of this subtraction is then checked as to whether the difference is positive ("RSLT PLUS?"). If not, the MC first checks, using flags stored in a controlled register, as to whether IDATA was called while the instrument was operating in the LATCH mode ("LTCH FLG=1?"). If so, the MC simply returns from IDATA; otherwise, the MC moves to a routine to output an overflow indication to the display ("OVFL"), as the data input represents a temperature below the operating range of the instrument.

Returning now to the step labelled "RSLT PLUS?", if the difference is positive, the MC proceeds to generate, using the input data, a table look-up address used to access the table of corrections for the sensor over the instrument's span ("GENERATE TABLE ADDR"). In the next step ("GET CORR 1"), the correction factor from the table for the temperature at the beginning of the ten-degree-Celsius chord in which the input data falls is accessed and then saved in a working register for future calculations in the step labelled "SAVE CORR 1".

Next, the table address is incremented, the correction factor for the end of the chord is accessed, and the first correction factor is subtracted from the latter ("GET CORR 2, SUBTRACT CORR 1"). Using the result of this subtraction and the relative position of the input data in the chord, the final correction factor is computed and applied to the data ("COMPUTE AND APPLY OFFSET"). The result is then stored in the registers reserved for corrected temperature equivalents ("STO RSLT IN TEMP REGS").

In the step labelled "[MIN REGS] MINUS [TEMP REGS]", the corrected data is compared to the contents of the registers in which the minimum recorded temperature is stored. If the result of the subtraction is positive, the corrected data represents a new minimum temperature and the corrected data is stored in the MIN registers ("RSLT PLUS?" and "[TEMP REGS] TO MIN REGS"). If the result is not positive, the corrected data is compared to the contents of the registers in which the maximum recorded temperature is stored ("[MAX REGS] MINUS [TEMP REGS]"). If that result is positive ("RSLT PLUS?"), no new maximum has been recorded and the MC returns from IDATA. Otherwise, the contents of the corrected temperature registers are also stored in the MAX registers ("]TEMP REGS] TO MAX REGS"), and the MC returns from IDATA.

The flow diagram given in FIG. 6 details the steps of the subroutine LATCH executed by the MC during the LATCH operating mode.

In the first step ("REQUEST CONFLICT?"), the MC checks the status of the mode and recall requests input from the rocker switches (see FIG. 8). Since these functions are exclusive, the presence of two or more requests simultaneously represents a conflict. In this case, the MC moves to a short routine ("EXIT") which resets a special control register used by the MC to flag the current operating mode or recall being executed ("RESET CONTROL REGISTER") and then the MC returns from LATCH.

If no conflict is present, the MC outputs to the display an indication of acceptance of the LATCH request ("OUTPUT "1111""), and then inputs the initial temperature at the sensor upon mode entry ("CALL IDATA"). This initial temperature is output to the display and stored in a working register for future use ("OUTPUT T1" and "SAVE T1").

Next the MC checks as to whether the LATCH request is still valid at the switches ("LATCH VALID?"). If not, it moves to the routine EXIT; otherwise, the MC begins a comparison sequence comprising the input of new data ("CALL IDATA"), the outputting of this data to the display ("OUTPUT NEW T"), the subtraction of the new temperature data from the initial temperature data ("T1 MINUS NEW T"), a check as to whether the result is positive ("RESULT PLUS?"), setting a special change of temperature direction flag to "1" if it is; and the clearing of that flag otherwise ("SET DIR FLAG" and "CLEAR DIR FLAG"). In this sequence the MC is testing for a temperature change. In the final step of the sequence ("RESULT ≧1?"), the MC tests the results of the comparison as to whether a temperature change greater than or equal to 1° C. has occured. If not, the MC re-enters the aforementioned comparison sequence.

If the change is greater than or equal to 1° C., the new temperature data is stored in designated LATCH registers ("SAVE NEW T IN LTCH REGS"). Next, the MC begins a sequence which tests for the extreme of the detected change. First, new data is input ("CALL IDATA"), then the new data is compared to the contents of the LATCH registers ("COMPARE [LTCH] REGS NEW T"). The MC then checks the change direction flag ("DIR FLAG=1?"). If the flag is "1", indicating a positive-going change, the result of the aforementioned comparison is checked as to whether the new data is greater than the contents of the LATCH registers ("T > [LTCH] REGS?"), if so, the new data is "written into" the LATCH registers ("TEMP TO LTCH REGS"), and the new data is output to the display; otherwise, the old contents of the LATCH registers is again output to the display ("OUTPUT [LTCH] REGS").

Returning now to the step labelled "DIR FLAG=1?", if the flag is "0", indicating a negative-going original change, the results of the earlier comparison are checked as to whether the new data represents a temperature less than that represented by the data stored in the LATCH registers ("T<[LTCH] REGS?"). If so, the new data is stored in the LATCH registers ("TEMP TO LTCH REGS") and output to the display; otherwise, the old contents of the LATCH registers is again output to the display ("OUTPUT [LTCH] REGS").

At this point, the MC checks the status of the inputs from the switches as to whether the LATCH request is still valid. If not, the MC moves to the EXIT routine and returns from the subroutine; otherwise, the MC returns to the beginning of the sequence which tests for the extreme of the temperature change.

FIG. 7 is a flow diagram giving the details of the steps executed by the MC during the rate-of-change-per-minute operating mode (subroutine ΔT/M, herein referred to as DELTA T).

Referring now to that figure, as when entering the earlier-described LATCH subroutine, the MC first checks for request conflicts input from the rocker switches ("RQST CONFLICT?"). If such conflict is present, the MC moves to the EXIT routine and returns from the DELTA T subroutine; otherwise, it outputs to the display an acknowledgement of the DELTA T request ("OUTPUT "2222"") and then inputs the initial temperature data upon mode entry ("CALL IDATA"). This initial data is then output to the display ("OUTPUT T").

In the next step, the MC clears a special shift flag which is used later in the subroutine to indicate any range shift which has occured during a call of the subroutine IDATA ("CLR SHFT FLG"). The values in registers which will be used to determined whether or not a calculated rate of temperature change results in an overflow of the instrument's calculational limits are stored in the appropriate working registers in the ensuing step ("SET ΔT LIMIT REGS"). Next, a counter register which will be utilized for timing purposes is set to equal 9 ("SET CNTRL CNTR=9").

The last temperature data input is now stored in the DELTA T registers ("MOVE LAST T TO ΔT REGS"), to be used in later calculations as to be described. At this point, the MC checks the inputs from the switches as to whether the DELTA T request is still valid ("ΔT/M RQST VALID?"). If not, it moves to the EXIT routine and returns from the DELTA T subroutine; otherwise, the following timing loop is initiated: subroutine IDATA is called ("CALL IDATA"), the control counter is decremented ("DEC CNTRL CNTR"), and then checked as to whether it is equal to zero ("CNTR=0?"). If not, IDATA is called again, and so on. If so, the MC begins the sequence which calculates the rate of temperature change. In the foregoing timing loop, IDATA is used as a timing device since that routine essentially counts one (two under special circumstances discussed later) EOC. As these signals occur once every 0.6666 seconds, accurate timing of a six-second interval is achieved by "counting" nine IDATA calls. In addition, calling IDATA insures that the MIN and MAX registers will be updated as necessary (see earlier discussion of subroutine IDATA).

The sequence of steps by which the MC calculates the rate of temperature change per minute begins with the subtraction of the data stored in the DELTA T registers at the beginning of the counting loop from the last temperature data input at the end of that loop ("T MINUS [ΔT REGS]"), in order to determine the amount of change in temperature (if any) during the period of the timing loop. Next the result is checked against the DELTA T limit registers ("RSLT MINUS [ΔT LIMIT REGS]") and the result of this comparison is then checked as to sign ("RSLT PLUS?"). If the result is positive, then the calculational limits of the instrument have been surpassed with respect to calculation of the rate of change per minute (change greater than ±499° C. per minute). In this case, the MC moves to a routine to output an overflow indication to the display; otherwise, it continues with the calculations.

Next, the shift flag is checked ("SHIFT FLAG=1?"). If it is set to "1", then a range shift has occurred during one of the calls of IDATA in the timing loop described earlier. In this case, the timed period is equal to 6.6666 seconds rather than the desired six seconds. The MC adjusts the results of its earlier calculations by subtracting ten percent of the amount of change from those results ("ADJUST RSLT"), thereby achieving a result indicative of the amount of that change for the intended six-second interval.

If the shift flag is not "1", then no adjustment of the earlier result is necessary.

In the ensuing step, the MC multiplies the amount of temperature change obtained earlier by ten ("COMPUTE ΔT/M"), thereby arriving at the desired result representing the rate of change per minute, based upon the relative change for six seconds.

As all internal calculations by the MC are performed using the Celsius scale based inputs, the status of the scale requests are then checked for the presence of a Fahrenheit scale request ("F RQST"). If such a request is present, the MC multiples the rate of change data by 1.8 ("CONVERT TO DEG F"); otherwise, it does nothing (note: the presence of a Kelvin scale request does not require conversion as 1° K.=1° C.).

At this point, the calculated data is output to the display ("OUTPUT ΔT/M"), after which the MC re-enters the DELTA T subroutine near the beginning of the routine (at "CLR SHIFT FLG") in preparation for the next set of calculations.

COMPLETE LISTING OF THE ROUTINES AND SUBROUTINES OF INSTRUCTIONS

Following is a complete assembly language listing of the program stored in the microcomputer ROM. Each page of the listing is numbered at the bottom with respect to its position in the specification as a whole. The following information is contained in the respective columns of the listing, counting columns from left to right across the page:

column one: decimal number of each line of each page,
column two: hexadecimal address of the ROM location in which each instruction or constant is stored,
columns three and four: two or four character hexadecimal representation of each instruction or constant,
column five: assembly labels
column six: mnemonic codes for the instructions followed by operands and labels associated with them,
remainder of page: explanatory remarks or notes when given. At the end of the listing is given a symbol table which correlates labels and their hexadecimal values. The information in columns two, three, four, and six is best understood by reference to the aforementioned publications associated with the Intel 8048 microcomputer.

***POWER-UP AND CONTROL***

```
00100                          *****POWER-UP AND CONTROL*****
00101                 *
00102                 *
00103  000  23 7F            MOV A, #$7F
00104  002  39               OUTL P1, A
00105  003  27               CLR A
00106  004  B8 28            MOV R0, #$28
00107  006  B9 2C            MOV R1, #$ 2C
00108  008  A0               MOV @R0, A
00109  009  A1               MOV @R1, A
00110  00A  18               INC R0
00111  00B  19               INC R1
00112  00C  A1               MOV @R1, A
00113  00D  B0 61             MOV @R0, #$61
00114  00F  AF               MOV R7, A
00115  010  AD               MOV R5, A
00116  011  14 84            CALL TRVLD      BLANK DISPLAY
00117  013  34 05            CALL IDATA      INPUT INIT TEMP
00118  015  0A    CKMOD      IN A, P2        INPUT REQUESTS
00119  016  37               CPL A
00120  017  53 0F            ANL A, #$0F
00121  019  2F               XCH A, R7
00122  01A  53 20            ANL A, #$20
00123  01C  DF               XRL A, R7
00124  01D  AF               MOV R7, A       SET CONTR REG
00125  01E  12 2C            JB0 GOLTCH      LATCH REQUEST ?
00126  020  32 30            JB1 GODT/M      DELTA T REQUEST?
00127  022  52 34            JB2 MINRCL      MIN REQUEST ?
00128  024  72 38            JB3 MAXRCL      MAX REQUEST ?
00129  026  34 05            CALL IDATA      INPUT TEMP
00130  028  74 3D            CALL OUT        OUTPUT TEMP
00131  02A  04 15            JMP CKMOD       RE-ENTER LOOP
00132  02C  54 16  GOLTCH    CALL LATCH
00133  02E  04 15            JMP CKMOD
00134  030  54 9C  GODT/M    CALL DT/M
00135  032  04 15            JMP CKMOD
00136  034  BD 33  MINRCL    MOV R5, #$33    SET MODE REG
00137  036  04 3B            JMP INDIC
00138  038  95     MAXRCL    CPL F0          SET FLAG = MAX
00139  039  BD 44            MOV R5, #$44    SET MODE REG
00140  03B  53 03  INDIC     ANL A, #$03     REQUEST CONFLICT ?
00141  03D  C6 41            JZ TRVOK
00142  03F  04 66            JMP CMBK
00143  041  14 84  TRVOK     CALL TRVLD      DISPLAY MODE
00144  043  A5     START     CLR F1          SET SIGN FLAG
00145  044  B6 4A            JF0 PREX
00146  046  B8 29            MOV R0, #$29    SET PTR = MIN
00147  048  04 4D            JMP INFO
```

| | | | | | |
|---|---|---|---|---|---|
| 00148 | 04A | B5 | PREX | CPL F1 | SET SIGN FLAG |
| 00149 | 04B | B8 2D | | MOV R0, #$2D | SET PTR = MAX |
| 00150 | 04D | B9 26 | INFO | MOV R1, #$26 | |
| 00151 | 04F | 34 F4 | | CALL MOV01 | MOVE DATA |
| 00152 | 051 | 74 3D | | CALL OUT | OUTPUT DATA |
| 00153 | 053 | 97 | | CLR C | |
| 00154 | 054 | B6 58 | | JF0 FLGP | |
| 00155 | 056 | 04 59 | | JMP INP2 | |
| 00156 | 058 | A7 | FLGP | CPL C | |
| 00157 | 059 | 0A | INP2 | IN A, P2 | INPUT REQUESTS |
| 00158 | 05A | F6 62 | | JC VALX | |
| 00159 | 05C | 52 66 | | JB2 CMBK | JMP MIN NOT VALID |
| 00160 | 05E | 34 05 | RPT | CALL IDATA | INPUT TEMP |
| 00161 | 060 | 04 43 | | JMP START | CONTINUE MIN / MAX OUT |
| 00162 | 062 | 72 66 | VALX | JB3 CMBK | JMP MAX NOT VALID |
| 00163 | 064 | 04 5E | | JMP RPT | |
| 00164 | 066 | 54 67 | CMBK | CALL EXIT | BEGIN RETURN ROUTINE |
| 00165 | 068 | 85 | | CLR F0 | RESET FLAG |
| 00166 | 069 | 04 15 | | JMP CKMOD | RE-ENTER CONTROL LOOP |
| 00167 | | | * | | |
| 00168 | | | * | | |
| 00169 | | | ***SUBROUTINES CPLR0, TRVLD, 3EOC,*** | | |
| 00170 | | | *    EOCSK, EOC , SUB2B BEGIN HERE | | |
| 00171 | | | * | | |
| 00172 | | | * | | |
| 00173 | 06B | 97 | CPLR0 | CLR C | |
| 00174 | 06C | F0 | | MOV A, @R0 | |
| 00175 | 06D | C6 7B | | JZ LKHI | JMP ON ZERO BYTE |
| 00176 | 06F | 14 F7 | | CALL TCPLMT | COMPLEMENT BYTE |
| 00177 | 071 | A0 | | MOV @R0, A | STO RSLT |
| 00178 | 072 | 18 | | INC R0 | |
| 00179 | 073 | F0 | | MOV A, @R0 | GET NEXT BYTE |
| 00180 | 074 | 03 66 | | ADD A, #$66 | |
| 00181 | 076 | 37 | | CPL A | |
| 00182 | 077 | A0 | STCPL | MOV @R0, A | STO RSLT |
| 00183 | 078 | 97 | | CLR C | |
| 00184 | 079 | C8 | DRET | DEC R0 | RESET R0 |
| 00185 | 07A | 83 | | RET | |
| 00186 | 07B | 18 | LKHI | INC R0 | |
| 00187 | 07C | F0 | | MOV A, @R0 | |
| 00188 | 07D | A7 | | CPL C | |
| 00189 | 07E | C6 79 | | JZ DRET | |
| 00190 | 080 | 14 F7 | | CALL TCPLMT | COMPLEMENT BYTE |
| 00191 | 082 | 04 77 | | JMP STCPL | |
| 00192 | 084 | B8 3E | TRVLD | MOV R0, #$3E | |
| 00193 | 086 | FD | | MOV A, R5 | GET MODE |
| 00194 | 087 | A0 | | MOV @R0, A | |
| 00195 | 088 | 18 | | INC R0 | |

| | | | | |
|---|---|---|---|---|
| 00196 | 089 | A0 | | MOV @R0, A | |
| 00197 | 08A | A5 | | CLR F1 | |
| 00198 | 08B | B5 | | CPL F1 | SET SIGN FLAG |
| 00199 | 08C | 9A DF | | ANL P2, #$DF | DEC PT OFF |
| 00200 | 08E | 74 5C | | CALL OUTC | OUTPUT MODE |
| 00201 | 090 | BA 01 | 3EOC | MOV R2, #$01 | SET CTR |
| 00202 | 092 | 14 96 | | CALL EOC | |
| 00203 | 094 | BA 02 | EOCSK | MOV R2, #$02 | |
| 00204 | 096 | 56 9A | EOC | JT1 DECR2 | JMP ON EOC HI |
| 00205 | 098 | 04 96 | | JMP EOC | |
| 00206 | 09A | 46 9E | DECR2 | JNT1 DECR | JMP ON EOC LO |
| 00207 | 09C | 04 9A | | JMP DECR2 | |
| 00208 | 09E | EA 96 | DECR | DJNZ R2, EOC | JMP R2 ≠ ZERO |
| 00209 | 0A0 | 93 | | RETR | |
| 00210 | 0A1 | 14 6B | SUB2B | CALL CPLR0 | |
| 00211 | 0A3 | F6 AC | | JC INCRT | |
| 00212 | 0A5 | 74 B3 | | CALL ADD2B | SUBTRACT BYTES |
| 00213 | 0A7 | F6 AB | | JC SRET | JMP RSLT PLUS |
| 00214 | 0A9 | 14 6B | | CALL CPLR0 | |
| 00215 | 0AB | 83 | SRET | RET | |
| 00216 | 0AC | 14 FE | INCRT | CALL MOV10 | MOVE RSLTS |
| 00217 | 0AE | C8 | | DEC R0 | |
| 00218 | 0AF | 83 | | RET | |
| 00219 | | | * | | |
| 00220 | | | * | | |
| 00221 | | | ***ROUTINE TO UPDATE MIN AND*** | | |
| 00222 | | | * MAX REGISTERS BEGINS HERE | | |
| 00223 | | | * | | |
| 00224 | | | * | | |
| 00225 | 0B0 | C5 | UPDMM | SEL RB0 | REGISTER BANK |
| 00226 | 0B1 | FF | | MOV A, R7 | |
| 00227 | 0B2 | 53 FE | | ANL A, #$FE | SET CONTR REG |
| 00228 | 0B4 | AF | | MOV R7, A | |
| 00229 | 0B5 | 14 EF | LTCHMM | CALL SETUP | LATCH UPDATE START |
| 00230 | 0B7 | 85 | | CLR F0 | |
| 00231 | 0B8 | FF | | MOV A, R7 | GET MODE |
| 00232 | 0B9 | 12 BF | | JB0 LTCHST | JMP ON LTCH RQST |
| 00233 | 0BB | 14 C5 | | CALL CPMIN | |
| 00234 | 0BD | 04 CD | | JMP CPMAX | |
| 00235 | 0BF | B9 2E | LTCHST | MOV R1, #$2E | |
| 00236 | 0C1 | F2 D1 | | JB7 LTCHPL | JMP TEMP UP |
| 00237 | 0C3 | 04 D2 | | JMP CMPRV | |
| 00238 | 0C5 | B9 29 | CPMIN | MOV R1, #$29 | MIN UPDATE START |
| 00239 | 0C7 | F1 | | MOV A, @R1 | GET MIN |
| 00240 | 0C8 | F2 D8 | | JB7 OLD | JMP ON MSB = 1 |
| 00241 | 0CA | C9 | | DEC R1 | |
| 00242 | 0CB | 04 D2 | | JMP CMPRV | |
| 00243 | 0CD | 14 EF | CPMAX | CALL SETUP | MAX UPDATE START |
| 00244 | 0CF | B9 2C | | MOV R1, #$2C | |

| | | | | | |
|---|---|---|---|---|---|
| 00245 | 0D1 | 95 | LTCHPL | CPL F0 | |
| 00246 | 0D2 | 14 A1 | CMPRV | CALL SUB2B | COMPARE VALUES |
| 00247 | 0D4 | B6 D9 | | JF0 MORE | |
| 00248 | 0D6 | F6 DC | | JC NEW | JMP ON NEW MIN |
| 00249 | 0D8 | 93 | OLD | RETR | |
| 00250 | 0D9 | E6 DC | MORE | JNC NEW | JMP ON NEW MAX |
| 00251 | 0DB | 93 | | RETR | |
| 00252 | 0DC | FF | NEW | MOV A, R7 | GET MODE |
| 00253 | 0DD | 12 EB | | JB0 STLTCH | JMP ON LTCH RQST |
| 00254 | 0DF | B6 E7 | | JF0 STMAX | JMP ON MAX FLAG |
| 00255 | 0E1 | B9 29 | | MOV R1, #$29 | READY STO MIN |
| 00256 | 0E3 | B8 26 | STNEW | MOV R0, #$26 | |
| 00257 | 0E5 | 24 F4 | | JMP MOV01 | STO NEW VALUE |
| 00258 | 0E7 | B9 2D | STMAX | MOV R1, #$2D | READY STO MAX |
| 00259 | 0E9 | 04 E3 | | JMP STNEW | |
| 00260 | 0EB | B9 2F | STLTCH | MOV R1, #$2F | READY STO LATCH |
| 00261 | 0ED | 04 E3 | | JMP STNEW | |
| 00262 | | | * | | |
| 00263 | | | * | | |
| 00264 | | | ***SUBROUTINES SETUP, TCPLMT,*** | | |
| 00265 | | | *   MOV10 BEGIN HERE | | |
| 00266 | | | * | | |
| 00267 | | | * | | |
| 00268 | 0EF | B9 25 | SETUP | MOV R1, #$25 | |
| 00269 | 0F1 | B8 2A | | MOV R0, #$2A | |
| 00270 | 0F3 | 14 FE | | CALL MOV10 | RESET DATA |
| 00271 | 0F5 | C8 | | DEC R0 | |
| 00272 | 0F6 | 93 | | RETR | |
| 00273 | 0F7 | 03 66 | TCPLMT | ADD A, #$66 | |
| 00274 | 0F9 | 37 | | CPL A | |
| 00275 | 0FA | 03 01 | | ADD A, #$01 | |
| 00276 | 0FC | 57 | | DA A | |
| 00277 | 0FD | 83 | | RET | |
| 00278 | 0FE | F1 | MOV10 | MOV A, @R1 | |
| 00279 | 0FF | A0 | | MOV @R0, A | |
| 00280 | 100 | 18 | | INC R0 | |
| 00281 | 101 | 19 | | INC R1 | |
| 00282 | 102 | F1 | | MOV A, @R1 | |
| 00283 | 103 | A0 | | MOV @R0, A | |
| 00284 | 104 | 83 | | RET | |
| 00285 | | | * | | |
| 00286 | | | * | | |
| 00287 | | | ***ROUTINE TO INPUT AND LINEARIZE*** | | |
| 00288 | | | *   TEMP BEGINS HERE | | |
| 00289 | | | * | | |
| 00290 | | | * | | |
| 00291 | 105 | D5 | IDATA | SEL RB1 | REGISTER BANK |
| 00292 | 106 | 56 0A | WLOOP | JT1 ENTER | JMP ON EOC HI |
| 00293 | 108 | 24 06 | | JMP WLOOP | |

| | | | | | |
|---|---|---|---|---|---|
| 00294 | 10A | B9 20 | ENTER | MOV R1, #$20 | BEGIN INIT |
| 00295 | 10C | BA 04 | | MOV R2, #$04 | |
| 00296 | 10E | BB 02 | | MOV R3, #$02 | |
| 00297 | 110 | BC 0F | | MOV R4, #$0F | |
| 00298 | 112 | BD 3F | | MOV R5, #$3F | |
| 00299 | 114 | BE 02 | | MOV R6, #$02 | |
| 00300 | 116 | C5 | | SEL RB0 | REGISTER BANK |
| 00301 | 117 | FF | | MOV A, R7 | GET CONTR FLAGS |
| 00302 | 118 | D5 | | SEL RB1 | REGISTER BANK |
| 00303 | 119 | 86 29 | INPT | JNI OKRGE | JMP ON NO OVF |
| 00304 | 11B | B2 25 | | JB5 GOOVFL | JMP ON RGE FLG HI |
| 00305 | 11D | 74 F5 | SHFTU | CALL SHIFT | SHIFT RANGE |
| 00306 | 11F | 9A 7F | | ORL P2, #$7F | |
| 00307 | 121 | 14 94 | | CALL EOCSK | WAIT FOR VALID EOC |
| 00308 | 123 | 24 05 | | JMP IDATA | INPUT AGAIN |
| 00309 | 125 | A5 | GOOVFL | CLR F1 | PREPARE FOR OVFL |
| 00310 | 126 | B5 | | CPL F1 | |
| 00311 | 127 | 24 4B | | JMP PMOVF | |
| 00312 | 129 | FD | OKRGE | MOV A, R5 | |
| 00313 | 12A | 03 10 | | ADD A, #$10 | |
| 00314 | 12C | AD | | MOV R5, A | |
| 00315 | 12D | 39 | | OUTL P1, A | REQUEST DIGIT |
| 00316 | 12E | 00 | | NOP | WAIT |
| 00317 | 12F | 00 | | NOP | |
| 00318 | 130 | 09 | | IN A, P1 | INPUT DIGIT |
| 00319 | 131 | 5C | | ANL A, R4 | |
| 00320 | 132 | EB 38 | | DJNZ, R3 PACK | JMP R3 ≠ ZERO |
| 00321 | 134 | BB 02 | | MOV R3, #$02 | RESET R3 |
| 00322 | 136 | 47 | | SWAP A | |
| 00323 | 137 | 31 | | XCHD A, @R1 | |
| 00324 | 138 | A1 | PACK | MOV @R1, A | STO DIGIT |
| 00325 | 139 | EE 3C | | DJNZ R6 CKDEC | JMP R6 ≠ ZERO |
| 00326 | 13B | 19 | | INC R1 | |
| 00327 | 13C | EA 29 | CKDEC | DJNZ, R2 OKRGE | JMP R2 ≠ ZERO |
| 00328 | 13E | C5 | | SEL RB0 | REGISTER BANK |
| 00329 | 13F | FF | | MOV A, R7 | GET CONTR FLAGS |
| 00330 | 140 | D5 | | SEL RB1 | REGISTER BANK |
| 00331 | 141 | B2 51 | | JB5 TSTRGE | JMP ON RGE FLG HI |
| 00332 | 143 | F1 | MIN30 | MOV A, @R1 | BEGIN SUBTR 30 DEG |
| 00333 | 144 | 03 97 | | ADD A, #$97 | |
| 00334 | 146 | 57 | | DA A | |
| 00335 | 147 | A1 | | MOV @R1, A | STO RSLT |
| 00336 | 148 | F6 63 | | JC LINR | JMP ON RSLT PLUS |
| 00337 | 14A | A5 | | CLR F1 | |
| 00338 | 14B | C5 | PMOVF | SEL RB0 | REGISTER BANK |
| 00339 | 14C | FF | | MOV A, R7 | GET CONTR FLAGS |
| 00340 | 14D | 92 C9 | | JB4 IRETR | JMP ON LATCH OVF |
| 00341 | 14F | 44 6C | | JMP OVFL | |
| 00342 | 151 | F1 | TSTRGE | MOV A, @R1 | |

| | | | | | |
|---|---|---|---|---|---|
| 00343 | 152 | 03 20 | | ADDA, #$20 | ADD 200 DEG |
| 00344 | 154 | A1 | | MOV @R1, A | STO RSLT |
| 00345 | 155 | 03 CA | | ADD A, #$CA | ABOVE 160 DEG ? |
| 00346 | 157 | F6 63 | | JC LINR | JMP ON RSLT PLUS |
| 00347 | 159 | 74 F5 | SHFTD | CALL SHIFT | SHIFT RANGE |
| 00348 | 15B | 8A 80 | | ORL P2, #$80 | |
| 00349 | 15D | BA 01 | | MOV R2, #$01 | PREPARE FOR EOC |
| 00350 | 15F | 14 96 | | CALL EOC | WAIT FOR VALID EOC |
| 00351 | 161 | 24 05 | | JMP IDATA | INPUT AGAIN |
| 00352 | 163 | B8 23 | LINR | MOV R0, #$23 | |
| 00353 | 165 | 27 | | CLR A | |
| 00354 | 166 | AB | | MOV R3, A | |
| 00355 | 167 | 85 | | CLR F0 | |
| 00356 | 168 | F1 | | MOV A, @R1 | GET HI BYTE |
| 00357 | 169 | AF | | MOV R7, A | STO BYTE IN REG |
| 00358 | 16A | 19 | | INC R1 | |
| 00359 | 16B | C6 A7 | | JZ ADR00 | JMP ON =ZERO |
| 00360 | 16D | 03 AF | | ADD A, #$AF | TST FOR #$51 |
| 00361 | 16F | C6 B1 | | JZ ADR51 | JMP ON = ZERO |
| 00362 | 171 | FF | | MOV A, R7 | GET BYTE AGAIN |
| 00363 | 172 | 03 F7 | | ADD A, #$F7 | TST FOR #$09 |
| 00363 | 174 | C6 BC | | JZ ADR09 | JMP ON = ZERO |
| 00364 | 176 | FF | | MOV A, R7 | GET BYTE AGAIN |
| 00365 | 177 | AE | | MOV R6, A | SETUP FOR TADDR |
| 00366 | 178 | 53 F0 | | ANL A, #$F0 | |
| 00367 | 17A | C6 85 | | JZ TADDR | JMP ON = ZERO |
| 00368 | 17C | 47 | | SWAP A | |
| 00369 | 17D | AA | | MOV R2, A | |
| 00370 | 17E | 27 | | CLR A | |
| 00371 | 17F | 03 06 | ADD6 | ADD A, #$06 | |
| 00372 | 181 | EA 7F | | DJNZ, R2 ADD6 | JMP R2 ≠ ZERO |
| 00373 | 183 | 37 | | CPL A | |
| 00374 | 184 | 17 | | INC A | |
| 00375 | 185 | 6E | TADDR | ADD A, R6 | |
| 00376 | 186 | AE | | MOV R6, A | |
| 00377 | 187 | E3 | | MOVP3 A, @A | GET FIRST OFFSET |
| 00378 | 188 | 53 7F | | ANL A, #$7F | MASK SIGN BIT |
| 00379 | 18A | A1 | | MOV @R1, A | STO RSLT |
| 00380 | 18B | 1E | | INC R6 | |
| 00381 | 18C | FE | | MOV A, R6 | |
| 00382 | 18D | E3 | | MOVP3 A, @A | GET SECOND OFFSET |
| 00383 | 18E | F2 92 | | JB7 UNMSK | JMP ON SIGN BIT HI |
| 00384 | 190 | 24 95 | | JMP STO2 | |
| 00385 | 192 | 53 7F | UNMSK | ANL A, #$7F | MASK SIGN BIT |
| 00386 | 194 | 95 | | CPL F0 | SET DIR FLAG |
| 00387 | 195 | A0 | STO2 | MOV @R0, A | STO RSLT |
| 00388 | 196 | F1 | | MOV A, @R1 | GET FIRST OFFSET |
| 00389 | 197 | C6 C6 | | JZ 2DIFF | JMP ON = ZERO |
| 00390 | 199 | 14 F7 | | CALL TCPLMT | COMPLEMENT OFFSET |

| | | | | | |
|---|---|---|---|---|---|
| 00391 | 19B | 60 | | ADD A, @R0 | SUBTRACT OFFSET |
| 00392 | 19C | 57 | | DA A | |
| 00393 | 19D | E6 A2 | | JNC DOWN | JMP ON RSLT MINUS |
| 00394 | 19F | AD | STODIF | MOV R5, A | STO RSLT |
| 00395 | 1A0 | 24 CA | | JMP INTRP | |
| 00396 | 1A2 | 14 F7 | DOWN | CALL TCPLMT | COMPLEMENT RSLT |
| 00397 | 1A4 | 1B | | INC R3 | SET SIGN FLG |
| 00398 | 1A5 | 24 9F | | JMP STODIF | |
| 00399 | 1A7 | B1 87 | ADR00 | MOV @R1, #$87 | |
| 00400 | 1A9 | 19 | | INC R1 | |
| 00401 | 1AA | B1 76 | | MOV @R1, #$76 | |
| 00402 | 1AC | 1B | | INC R3 | |
| 00403 | 1AD | BD 11 | | MOV R5, #$11 | |
| 00404 | 1AF | 24 CA | | JMP INTRP | |
| 00405 | 1B1 | B1 07 | ADR51 | MOV @R1, #$07 | |
| 00406 | 1B3 | 19 | | INC R1 | |
| 00407 | 1B4 | B1 00 | | MOV @R1, #$00 | |
| 00408 | 1B6 | 1B | | INC R3 | |
| 00409 | 1B7 | 95 | | CPL F0 | |
| 00410 | 1B8 | BD 07 | | MOV R5, #$07 | |
| 00411 | 1BA | 24 CA | | JMP INTRP | |
| 00412 | 1BC | B1 00 | ADR09 | MOV @R1, #$00 | |
| 00413 | 1BE | 19 | | INC R1 | |
| 00414 | 1BF | B1 09 | | MOV @R1, #$09 | |
| 00415 | 1C1 | 95 | | CPL F0 | |
| 00416 | 1C2 | BD 09 | | MOV R5, #$09 | |
| 00417 | 1C4 | 24 CA | | JMP INTRP | |
| 00418 | 1C6 | F0 | 2DIFF | MOV A, @R0 | GET OFFSET |
| 00419 | 1C7 | 24 9F | | JMP STODIF | |
| 00420 | 1C9 | 93 | IRETR | RETR | |
| 00421 | 1CA | B8 20 | INTRP | MOV R0, #$20 | |
| 00422 | 1CC | BE 00 | | MOV R6, #$00 | |
| 00423 | 1CE | F0 | | MOV A, @R0 | GET LO BYTE |
| 00424 | 1CF | 74 BF | | CALL DIVL | DIVIDE BY TEN |
| 00425 | 1D1 | C6 DD | | JZ READY | JMP ON RSLT ZERO |
| 00426 | 1D3 | 92 EF | | JB4 USE2 | JMP ON RSLT #$10 |
| 00427 | 1D5 | AA | | MOV R2, A | |
| 00428 | 1D6 | 27 | | CLR A | |
| 00429 | 1D7 | 6D | TIMES | ADD A, R5 | |
| 00430 | 1D8 | 57 | | DA A | |
| 00431 | 1D9 | EA D7 | | DJNZ, R2 TIMES | JMP ON R2 ≠ ZERO |
| 00432 | 1DB | 74 BF | | CALL DIVL | DIVIDE BY TEN |
| 00433 | 1DD | B9 22 | READY | MOV R1, #$22 | |
| 00434 | 1DF | EB E3 | | DJNZ, R3 ADDDF | JMP ON R3 ≠ ZERO |
| 00435 | 1E1 | 14 F7 | | CALL TCPLMT | COMPLEMENT RSLT |
| 00436 | 1E3 | 61 | ADDDF | ADD A, @R1 | |
| 00437 | 1E4 | 57 | | DA A | |
| 00438 | 1E5 | 95 | OFFBR | CPL F0 | CPL DIR FLG |
| 00439 | 1E6 | B6 FB | | JF0 ADDOF | |

| | | | | | |
|---|---|---|---|---|---|
| 00440 | 1E8 | C6 FB | | JZ ADDOF | |
| 00441 | 1EA | 14 F7 | | CALL TCPLMT | COMPLEMENT OFFSET |
| 00442 | 1EC | 1E | | INC R6 | SET RSLT FLAG |
| 00443 | 1ED | 24 FB | | JMP ADDOF | |
| 00444 | 1EF | B9 23 | USE2 | MOV R1, #$23 | |
| 00445 | 1F1 | F1 | | MOV A, @R1 | |
| 00446 | 1F2 | 24 E5 | | JMP OFFBR | |
| 00447 | | | * | | |
| 00448 | | | * | | |
| 00449 | | | ***SUBROUTINE MOV01 BEGINS*** | | |
| 00450 | | | * HERE | | |
| 00451 | | | * | | |
| 00452 | | | * | | |
| 00453 | 1F4 | F0 | MOV01 | MOV A, @R0 | |
| 00454 | 1F5 | A1 | | MOV @R1, A | |
| 00455 | 1F6 | C8 | | DEC R0 | |
| 00456 | 1F7 | C9 | | DEC R1 | |
| 00457 | 1F8 | F0 | | MOV A, @R0 | |
| 00458 | 1F9 | A1 | | MOV @R1, A | |
| 00459 | 1FA | 93 | | RETR | |
| 00460 | | | * | | |
| 00461 | | | * | | |
| 00462 | | | ***INTERPOLATION ROUTINE*** | | |
| 00463 | | | * CONTINUES HERE | | |
| 00464 | | | * | | |
| 00465 | | | * | | |
| 00466 | 1FB | 60 | ADDOF | ADD A, @R0 | |
| 00467 | 1FC | 57 | | DA A | |
| 00468 | 1FD | 18 | | INC R0 | |
| 00469 | 1FE | B9 25 | | MOV R1, #$25 | |
| 00470 | 200 | A1 | | MOV @R1, A | |
| 00471 | 201 | 19 | | INC R1 | |
| 00472 | 202 | F0 | | MOV A, @R0 | |
| 00473 | 203 | F6 0D | | JC CARR1 | |
| 00474 | 205 | EE 0A | | DJNZ, R6 STOH | JMP ON R6 ≠ ZERO |
| 00475 | 207 | 03 99 | | ADD A, #$99 | |
| 00476 | 209 | 57 | | DA A | |
| 00477 | 20A | A1 | STOH | MOV @R1, A | STO RSLT |
| 00478 | 20B | 04 B0 | | JMP UPDMM | EXIT INPUT ROUTINE |
| 00479 | 20D | EE 11 | CARR1 | DJNZ, R6 INCTH | JMP ON R6 ≠ ZERO |
| 00480 | 20F | 44 0A | | JMP STOH | |
| 00481 | 211 | 03 01 | INCTH | ADD A, #$01 | INC HI BYTE |
| 00482 | 213 | 57 | | DA A | |
| 00483 | 214 | 44 0A | | JMP STOH | |
| 00484 | | | * | | |
| 00485 | | | * | | |
| 00486 | | | ***LATCH ROUTINE STARTS HERE*** | | |
| 00487 | | | * | | |
| 00488 | | | * | | |

| | | | | | |
|---|---|---|---|---|---|
| 00489 | 216 | 54 60 | LATCH | CALL MMCK | REQUEST CONFLICT ? |
| 00490 | 218 | BD 11 | | MOV R5, #$11 | SET MODE REG |
| 00491 | 21A | 14 84 | | CALL TRVLD | DISPLAY MODE |
| 00492 | 21C | 34 05 | | CALL IDATA | INPUT TEMP |
| 00493 | 21E | 74 3D | | CALL OUT | OUTPUT TEMP |
| 00494 | 220 | B8 26 | | MOV R0, #$26 | |
| 00495 | 222 | B9 2F | | MOV R1, #$2F | |
| 00496 | 224 | 34 F4 | | CALL MOV01 | TEMP TO LTCH REGS |
| 00497 | 226 | 0A | SIGCK | IN A, P2 | INPUT REQUESTS |
| 00498 | 227 | 12 67 | | JB0 EXIT | JMP LTCH NOT VALID |
| 00499 | 229 | 34 05 | | CALL IDATA | INPUT NEXT TEMP |
| 00500 | 22B | 74 3D | | CALL OUT | OUTPUT TEMP |
| 00501 | 22D | B9 25 | | MOV R1, #$25 | |
| 00502 | 22F | B8 30 | | MOV R0, #$30 | |
| 00503 | 231 | 14 FE | | CALL MOV10 | STO NEW TEMP |
| 00504 | 233 | C8 | | DEC R0 | |
| 00505 | 234 | B9 2E | | MOV R1, #$2E | |
| 00506 | 236 | 14 A1 | | CALL SUB2B | START SIGNIF TEST |
| 00507 | 238 | FF | | MOV A, R7 | GET CONTR REG |
| 00508 | 239 | E6 3F | | JNC UPWRD | JMP RSLT MINUS |
| 00509 | 23B | 53 7F | | ANL A, #$7F | SET LTCH DIR FLG |
| 00510 | 23D | 44 41 | | JMP SIG | |
| 00511 | 23F | 43 80 | UPWRD | ORL A, #$80 | SET LTCH DIR FLG |
| 00512 | 241 | 17 | SIG | INC A | RESET LTCH FLG |
| 00513 | 242 | AF | | MOV R7, A | |
| 00514 | 243 | F0 | | MOV A, @R0 | |
| 00515 | 244 | 03 EF | | ADD A, #$EF | GREATER THAN/=#$10 ? |
| 00516 | 246 | F6 4C | | JC SIGYS | JMP IF YES |
| 00517 | 248 | 18 | | INC R0 | |
| 00518 | 249 | F0 | | MOV A, @R0 | GET HI BYTE |
| 00519 | 24A | C6 26 | | JZ SIGCK | JMP ON ZERO BYTE |
| 00520 | 24C | 14 B5 | SIGYS | CALL LTCHMM | UPDATE LTCH REGS |
| 00521 | 24E | 34 05 | ROLL | CALL IDATA | INPUT NEW TEMP |
| 00522 | 250 | 1F | | INC R7 | RESET LTCH FLG |
| 00523 | 251 | 14 B5 | | CALL LTCHMM | UPDATE LTCH REGS |
| 00524 | 253 | B8 2F | | MOV R0, #$2F | |
| 00525 | 255 | B9 26 | | MOV R1, #$26 | |
| 00526 | 257 | 34 F4 | | CALL MOV01 | |
| 00527 | 259 | 74 3D | | CALL OUT | OUTPUT LATCH REGS |
| 00528 | 25B | 0A | | IN A, P2 | INPUT REQUESTS |
| 00529 | 25C | 12 67 | | JB0 EXIT | JMP LTCH NOT VALID |
| 00530 | 25E | 44 4E | | JMP ROLL | REPEAT |
| 00531 | | | * | | |
| 00532 | | | * | | |
| 00533 | | | *****SUBROUTINE MMCK AND ROUTINES | | |
| 00534 | | | * DECRT AND EXIT BEGIN HERE | | |
| 00535 | | | * | | |
| 00536 | | | * | | |
| 00537 | 260 | 53 0C | MMCK | ANL A, #$0C | MASK CONTR FLAGS |

| | | | | | |
|---|---|---|---|---|---|
| 00538 | 262 | C6 6B | | JZ RQOK | JMP NO CONFLICT |
| 00539 | 264 | C7 | DECRT | MOV A, PSW | |
| 00540 | 265 | 07 | | DEC A | |
| 00541 | 266 | D7 | | MOV PSW, A | DEC STK PTR |
| 00542 | 267 | FF | EXIT | MOV A, R7 | GET CONTR REG |
| 00543 | 268 | 53 20 | | ANL A, #$20 | RESET CONTR REG |
| 00544 | 26A | AF | | MOV R7, A | |
| 00545 | 26B | 93 | RQOK | RETR | |
| 00546 | | | * | | |
| 00547 | | | * | | |
| 00548 | | | ***OVERFLOW ROUTINE BEGINS HERE*** | | |
| 00549 | | | * | | |
| 00550 | | | * | | |
| 00551 | 26C | C5 | OVFL | SEL RB0 | REGISTER BANK |
| 00552 | 26D | 23 99 | | MOV A, #$99 | |
| 00553 | 26F | 76 75 | | JF1 HIGH | JMP ON PLUS FLG |
| 00554 | 271 | B8 29 | | MOV R0, #$29 | |
| 00555 | 273 | 44 77 | | JMP DBLST | |
| 00556 | 275 | B8 2D | HIGH | MOV R0, #$2D | |
| 00557 | 277 | A0 | DBLST | MOV @R0, A | |
| 00558 | 278 | C8 | | DEC R0 | |
| 00559 | 279 | A0 | | MOV @R0, A | |
| 00560 | 27A | FF | | MOV A, R7 | GET CONTR FLAGS |
| 00561 | 27B | 52 8D | | JB2 ORET | JMP ON MIN FLG |
| 00562 | 27D | 72 8D | | JB3 ORET | JMP ON MAX FLG |
| 00563 | 27F | B8 26 | CPOVF | MOV R0, #$26 | BEGIN OUTPUT NINES |
| 00564 | 281 | 23 99 | | MOV A, #$99 | |
| 00565 | 283 | A0 | | MOV @R0, A | |
| 00566 | 284 | C8 | | DEC R0 | |
| 00567 | 285 | A0 | | MOV @R0, A | |
| 00568 | 286 | 74 3D | | CALL OUT | OUTPUT NINES |
| 00569 | 288 | FF | | MOV A, R7 | GET CONTR FLGS |
| 00570 | 289 | 12 8E | | JB0 LLOOP | JMP ON LTCH FLG |
| 00571 | 28B | 32 98 | | JB1 WTRET | JMP ON DELTA T FLG |
| 00572 | 28D | 93 | ORET | RETR | |
| 00573 | 28E | 43 10 | LLOOP | ORL A, #$10 | SET OVF FLG |
| 00574 | 290 | AF | | MOV R7, A | |
| 00575 | 291 | 0A | | IN A, P2 | INPUT REQUESTS |
| 00576 | 292 | 12 64 | | JB0 DECRT | JMP ON LTCH NOT VALID |
| 00577 | 294 | 34 05 | | CALL IDATA | INPUT TEMP |
| 00578 | 296 | 44 7F | | JMP CPOVF | OUTPUT NINES AGAIN |
| 00579 | 298 | 14 90 | WTRET | CALL 3EOC | SKIP THREE EOCS |
| 00580 | 29A | 44 64 | | JMP DECRT | |
| 00581 | | | * | | |
| 00582 | | | * | | |
| 00583 | | | ***DELTA T / M ROUTINE BEGINS HERE*** | | |
| 00584 | | | * | | |
| 00585 | | | * | | |
| 00586 | 29C | 54 60 | DT/M | CALL MMCK | REQUEST CONFLICT ? |

| | | | | | |
|---|---|---|---|---|---|
| 00587 | 29E | BD 22 | | MOV R5, #$22 | SET MODE REG |
| 00588 | 2A0 | 14 84 | | CALL TRVLD | DISPLAY MODE |
| 00589 | 2A2 | 34 05 | | CALL IDATA | INPUT INIT TEMP |
| 00590 | 2A4 | 74 3D | | CALL OUT | OUTPUT INIT TEMP |
| 00591 | 2A6 | FF | REGO | MOV A, R7 | GET CONTR FLAGS |
| 00592 | 2A7 | 53 BF | | ANL A, #$BF | CLR SHFT FLG |
| 00593 | 2A9 | AF | | MOV R7, A | |
| 00594 | 2AA | B8 38 | | MOV R0, #$38 | |
| 00595 | 2AC | B0 00 | | MOV @R0, #$00 | LOAD OVF VAL LO |
| 00596 | 2AE | 18 | | INC R0 | |
| 00597 | 2AF | B0 05 | | MOV @R0, #$05 | LOAD OVF VAL HI |
| 00598 | 2B1 | BA 09 | | MOV R2, #$09 | LOAD TIMER REG |
| 00599 | 2B3 | B8 32 | | MOV R0, #$32 | |
| 00600 | 2B5 | B9 25 | | MOV R1, #$25 | |
| 00601 | 2B7 | 14 FE | | CALL MOV10 | SAVE INIT TEMP |
| 00602 | 2B9 | 0A | COUNT | IN A, P2 | INPUT REQUESTS |
| 00603 | 2BA | 32 67 | | JB1 EXIT | JMP ON DT/M NOT VALID |
| 00604 | 2BC | 34 05 | | CALL IDATA | INPUT TEMP |
| 00605 | 2BE | EA B9 | | DJNZ, R2 COUNT | JMP ON R2 ≠ ZERO |
| 00606 | 2C0 | B8 32 | | MOV R0, #$32 | |
| 00607 | 2C2 | B9 25 | | MOV R1, #$25 | |
| 00608 | 2C4 | 14 A1 | | CALL SUB2B | COMPUTE DELTA T |
| 00609 | 2C6 | A5 | | CLR F1 | |
| 00610 | 2C7 | E6 CA | | JNC FLGOK | JMP ON MINUS RSLT |
| 00611 | 2C9 | B5 | | CPL F1 | |
| 00612 | 2CA | B8 38 | FLGOK | MOV R0, #$38 | |
| 00613 | 2CC | B9 32 | | MOV R1, #$32 | |
| 00614 | 2CE | 14 A1 | | CALL SUB2B | CK FOR OVFL |
| 00615 | 2D0 | E6 D4 | | JNC CKR7 | JMP ON MINUS RSLT |
| 00616 | 2D2 | 54 7F | | CALL CPOVF | |
| 00617 | 2D4 | FF | CKR7 | MOV A, R7 | GET CONTR FLAGS |
| 00618 | 2D5 | D2 F1 | | JB6 ADJST | JMP ON SHFT FLG HI |
| 00619 | 2D7 | F1 | RIGHT | MOV A, @R1 | START COMP DT/M |
| 00620 | 2D8 | 47 | | SWAP A | |
| 00621 | 2D9 | A1 | | MOV @R1, A | |
| 00622 | 2DA | C9 | | DEC R1 | |
| 00623 | 2DB | F1 | | MOV A, @R1 | |
| 00624 | 2DC | 47 | | SWAP A | |
| 00625 | 2DD | A1 | | MOV @R1, A | |
| 00626 | 2DE | 27 | | CLR A | |
| 00627 | 2DF | 31 | | XCHD A, @R1 | |
| 00628 | 2E0 | 19 | | INC R1 | |
| 00629 | 2E1 | 31 | | XCHD A, @R1 | |
| 00630 | 2E2 | C9 | | DEC R1 | |
| 00631 | 2E3 | 36 E7 | | JT0 DTOUT | JMP ON NO F RQST |
| 00632 | 2E5 | 74 CF | | CALL 1*8R1 | CONVERT TO DEGS F |
| 00633 | 2E7 | B8 3E | DTOUT | MOV R0, #$3E | |
| 00634 | 2E9 | 14 FE | | CALL MOV10 | |
| 00635 | 2EB | 8A 20 | | ORL P2, #$20 | DECIMAL POINT ON |

| | | | | | |
|---|---|---|---|---|---|
| 00636 | 2ED | 74 5C | | CALL OUTC | OUTPUT DT/M |
| 00637 | 2EF | 44 A6 | | JMP REGO | RE-ENTER ROUTINE |
| 00638 | 2F1 | B8 32 | ADJST | MOV R0, #$32 | |
| 00639 | 2F3 | 74 E3 | | CALL DIV10 | COMPUTE ERROR |
| 00640 | 2F5 | B8 34 | | MOV R0, #$34 | |
| 00641 | 2F7 | B9 32 | | MOV R1, #$32 | |
| 00642 | 2F9 | 14 A1 | | CALL SUB2B | SUBTRACT ERROR |
| 00643 | 2FB | 18 | | INC R0 | |
| 00644 | 2FC | 34 F4 | | CALL MOV01 | RSLT TO DT/M REGS |
| 00645 | 2FE | 19 | | INC R1 | |
| 00646 | 2FF | 44 D7 | | JMP RIGHT | |
| 00647 | | | * | | |
| 00648 | | | * | | |
| 00649 | | | ***TABLE OF CORRECTIONS*** | | |
| 00650 | | | * TYPICAL VALUES | | |
| 00651 | | | * PROBE DEPENDENT | | |
| 00652 | | | * | | |
| 00653 | | | * | | |
| 00654 | 301 | 76 | TABLE | | −190 C |
| 00655 | 302 | 65 | | | |
| 00656 | 303 | 54 | | | |
| 00657 | 304 | 47 | | | |
| 00658 | 305 | 36 | | | −150 C |
| 00659 | 306 | 25 | | | |
| 00660 | 307 | 15 | | | |
| 00661 | 308 | 07 | | | |
| 00662 | 309 | 00 | | | |
| 00663 | 30A | 89 | | | −100 C |
| 00664 | 30B | 97 | | | |
| 00665 | 30C | A3 | | | |
| 00666 | 30D | A9 | | | |
| 00667 | 30E | B4 | | | |
| 00668 | 30F | B8 | | | −50 C |
| 00669 | 310 | C4 | | | |
| 00670 | 311 | C8 | | | |
| 00671 | 312 | D4 | | | |
| 00672 | 313 | D7 | | | |
| 00673 | 314 | E1 | | | 0 C |
| 00674 | 315 | E4 | | | |
| 00675 | 316 | E7 | | | |
| 00676 | 317 | F0 | | | |
| 00677 | 318 | F2 | | | |
| 00678 | 319 | F3 | | | 50 C |
| 00679 | 31A | F4 | | | |
| 00680 | 31B | F5 | | | |
| 00681 | 31C | F6 | | | |
| 00682 | 31D | F7 | | | |
| 00683 | 31E | F7 | | | 100 C |
| 00684 | 31F | F7 | | | |

| | | | | | |
|---|---|---|---|---|---|
| 00685 | 320 | F6 | | | |
| 00686 | 321 | F5 | | | |
| 00687 | 322 | F3 | | | |
| 00688 | 323 | F1 | | | 150 C |
| 00689 | 324 | F0 | | | |
| 00690 | 325 | E8 | | | |
| 00691 | 326 | E7 | | | |
| 00692 | 327 | E4 | | | |
| 00693 | 328 | E2 | | | 200 C |
| 00694 | 329 | D9 | | | |
| 00695 | 32A | D5 | | | |
| 00696 | 32B | D2 | | | |
| 00697 | 32C | C8 | | | |
| 00698 | 32D | C3 | | | 250 C |
| 00699 | 32E | B8 | | | |
| 00700 | 32F | B4 | | | |
| 00701 | 330 | A7 | | | |
| 00702 | 331 | A1 | | | |
| 00703 | 332 | 95 | | | 300 C |
| 00704 | 333 | 87 | | | |
| 00705 | 334 | 00 | | | |
| 00706 | 335 | 07 | | | |
| 00707 | 336 | 14 | | | |
| 00708 | 337 | 23 | | | 350 C |
| 00709 | 338 | 32 | | | |
| 00710 | 339 | 42 | | | |
| 00711 | 33A | 52 | | | |
| 00712 | 33B | 63 | | | |
| 00713 | 33C | 72 | | | 400 C |
| 00714 | | | * | | |
| 00715 | | | * | | |
| 00716 | | | ***OUTPUT ROUTINES OUT, OUTC,*** | | |
| 00717 | | | * OUTF, OUTK BEGIN HERE | | |
| 00718 | | | * | | |
| 00719 | | | * | | |
| 00720 | 33D | D5 | OUT | SEL RB1 | REGISTER BANK |
| 00721 | 33E | B8 3E | | MOV R0, #$3E | |
| 00722 | 340 | B9 25 | | MOV R1, #$25 | |
| 00723 | 342 | 14 FE | | CALL MOV10 | TEMP TO OUTPUT REGS |
| 00724 | 344 | 9A DF | | ANL P2, #$DF | DECIMAL POINT OFF |
| 00725 | 346 | F2 5C | | JB7 OUTC | JMP ON MSD NINE |
| 00726 | 348 | 8A 20 | | ORL P2, #$20 | DECIMAL POINT ON |
| 00727 | 34A | A5 | | CLR F1 | CLR SIGN FLG |
| 00728 | 34B | 03 80 | | ADD A, #$80 | MINUS 200 DEG |
| 00729 | 34D | 57 | | DA A | |
| 00730 | 34E | A0 | | MOV @R0, A | |
| 00731 | 34F | C8 | | DEC R0 | |
| 00732 | 350 | B5 | | CPL F1 | SET SIGN FLG PLUS |
| 00733 | 351 | F6 56 | | JC SCALE | JMP ON RSLT PLUS |

| | | | | | |
|---|---|---|---|---|---|
| 00734 | 353 | 14 6B | | CALL CPLR0 | COMPLEMENT RSLT |
| 00735 | 355 | B5 | | CPL F1 | SET SIGN FLG MINUS |
| 00736 | 356 | 0A | SCALE | IN A, P2 | INPUT REQUESTS |
| 00737 | 357 | 37 | | CPL A | |
| 00738 | 358 | 92 9F | | JB4 OUTK | DEG K RQST ? |
| 00739 | 35A | 26 84 | | JNT0 OUTF | DEG F RQST ? |
| 00740 | 35C | D5 | OUTC | SEL RB1 | REGISTER BANK |
| 00741 | 35D | B8 3E | | MOV R0, #$3E | |
| 00742 | 35F | BB 08 | | MOV R3, #$08 | |
| 00743 | 361 | BC 02 | | MOV R4, #$02 | |
| 00744 | 363 | BA 02 | CNT2 | MOV R2, #$02 | |
| 00745 | 365 | 27 | DIG | CLR A | |
| 00746 | 366 | 4B | | ORL A, R3 | |
| 00747 | 367 | E7 | | RL A | |
| 00748 | 368 | AB | | MOV R3, A | |
| 00749 | 369 | 30 | | XCHD A, @R0 | |
| 00750 | 36A | 02 | | OUTL BUS, A | |
| 00751 | 36B | BD 20 | | MOV R5, #$20 | LOAD WAIT TIMER |
| 00752 | 36D | 00 | DELAY | NOP | |
| 00753 | 36E | ED 6D | | DJNZ R5, DELAY | JMP ON R5 ≠ ZERO |
| 00754 | 370 | 98 0F | | ANL BUS, #$0F | DIG SEL LO |
| 00755 | 372 | 20 | | XCH A, @R0 | |
| 00756 | 373 | 47 | | SWAP A | |
| 00757 | 374 | 20 | | XCH A, @R0 | |
| 00758 | 375 | EA 65 | | DJNZ R2, DIG | JMP ON R2 ≠ ZERO |
| 00759 | 377 | EC 81 | | DJNZ R4, GROUP | JMP ON R4 ≠ ZERO |
| 00760 | 379 | 76 7E | | JF1 PSIGN | JMP ON SIGN FLG HI |
| 00761 | 37B | 8A 40 | | ORL P2, #$40 | MINUS SIGN ON |
| 00762 | 37D | 93 | | RETR | |
| 00763 | 37E | 9A BF | PSIGN | ANL P2, #$BF | MINUS SIGN OFF |
| 00764 | 380 | 93 | | RETR | |
| 00765 | 381 | 18 | GROUP | INC R0 | |
| 00766 | 382 | 64 63 | | JMP CNT2 | |
| 00767 | 384 | B9 3E | OUTF | MOV R1, #$3E | |
| 00768 | 386 | 74 CF | | CALL 1*8R1 | COMPUTE F DEGS |
| 00769 | 388 | B8 37 | | MOV R0, #$37 | |
| 00770 | 38A | B0 03 | | MOV @R0, #$03 | |
| 00771 | 38C | C8 | | DEC R0 | |
| 00772 | 38D | B0 20 | | MOV @R0, #$20 | |
| 00773 | 38F | 76 98 | | JF1 ADDF | JMP ON SIGN FLG HI |
| 00774 | 391 | 14 A1 | | CALL SUB2B | SUBTR F OFFSET |
| 00775 | 393 | F6 9A | | JC END | JMP ON RSLT PLUS |
| 00776 | 395 | B5 | | CPL F1 | SET SIGN FLG PLUS |
| 00777 | 396 | 64 9A | | JMP END | |
| 00778 | 398 | 74 B3 | ADDF | CALL ADD2B | ADD F OFFSET |
| 00779 | 39A | 18 | END | INC R0 | |
| 00780 | 39B | 34 F4 | | CALL MOV01 | |
| 00781 | 39D | 64 5C | | JMP OUTC | |

| | | | | | |
|---|---|---|---|---|---|
| 00782 | 39F | B8 3E | OUTK | MOV R0, #$3E | |
| 00783 | 3A1 | B9 3D | | MOV R1, #$3D | |
| 00784 | 3A3 | B1 27 | | MOV @R1, #$27 | |
| 00785 | 3A5 | C9 | | DEC R1 | |
| 00786 | 3A6 | B1 32 | | MOV @R1, #$32 | |
| 00787 | 3A8 | 76 AF | | JF1 ADDK | JMP ON SIGN FLG HI |
| 00788 | 3AA | 14 A1 | | CALL SUB2B | SUBTR DEGS C |
| 00789 | 3AC | B5 | | CPL F1 | SET SIGN FLG PLUS |
| 00790 | 3AD | 64 5C | | JMP OUTC | |
| 00791 | 3AF | 74 B3 | ADDK | CALL ADD2B | ADD K OFFSET |
| 00792 | 3B1 | 64 5C | | JMP OUTC | |
| 00793 | | | * | | |
| 00794 | | | * | | |
| 00795 | | | *****SUBROUTINES ADD2B, DIVL, 1*8R1***** | | |
| 00796 | | | * DIV10, SHIFT BEGIN HERE | | |
| 00797 | | | * | | |
| 00798 | | | * | | |
| 00799 | 3B3 | F1 | ADD2B | MOV A, @R1 | |
| 00800 | 3B4 | 60 | | ADD A, @R0 | ADD LO BYTES |
| 00801 | 3B5 | 57 | | DA A | |
| 00802 | 3B6 | 20 | | XCHA, @R0 | STO RSLT |
| 00803 | 3B7 | 18 | | INC R0 | |
| 00804 | 3B8 | 19 | | INC R1 | |
| 00805 | 3B9 | F1 | | MOV A, @R1 | |
| 00806 | 3BA | 70 | | ADDC A, @R0 | ADD HI BYTES |
| 00807 | 3BB | 57 | | DA A | |
| 00808 | 3BC | 20 | | XCHA, @R0 | STO RSLT |
| 00809 | 3BD | C8 | | DEC R0 | |
| 00810 | 3BE | 83 | | RET | |
| 00811 | 3BF | B9 27 | DIVL | MOV R1, #$27 | |
| 00812 | 3C1 | B1 00 | | MOV @R1, #$00 | |
| 00813 | 3C3 | 31 | | XCHD A, @R1 | |
| 00814 | 3C4 | 47 | | SWAP A | |
| 00815 | 3C5 | 21 | | XCHA, @R1 | |
| 00816 | 3C6 | 03 FB | | ADD A, #$FB | REMDR FIVE OR MORE ? |
| 00817 | 3C8 | 21 | | XCHA, @R1 | |
| 00818 | 3C9 | E6 CE | | JNC DRTRS | JMP ON LESS THAN FIVE |
| 00819 | 3CB | 03 01 | | ADD A, #$01 | |
| 00820 | 3CD | 57 | | DA A | |
| 00821 | 3CE | 93 | DRTRS | RETR | |
| 00822 | 3CF | F9 | 1*8R1 | MOV A, R1 | |
| 00823 | 3D0 | A8 | | MOV R0, A | |
| 00824 | 3D1 | 74 B3 | | CALL ADD2B | MULT BY TWO |
| 00825 | 3D3 | 74 E3 | | CALL DIV10 | DIVIDE BY TEN |
| 00826 | 3D5 | E6 D9 | | JNC CMPT2 | |
| 00827 | 3D7 | 19 | | INC R1 | |
| 00828 | 3D8 | 11 | | INC @R1 | |
| 00829 | 3D9 | C8 | CMPT2 | DEC R0 | |
| 00830 | 3DA | F8 | | MOV A, R0 | |

```
00831   3DB   A9              MOV R1, A
00832   3DC   B8 34           MOV R0, #$34
00833   3DE   14 A1           CALL SUB2B        SUBTR TWO TENTHS
00834   3E0   18              INC R0
00835   3E1   24 F4           JMP MOV 01
00836   3E3   F0      DIV10   MOV A, @R0
00837   3E4   74 BF           CALL DIVL         DIV LO BYTE BY TEN
00838   3E6   B9 34           MOV R1, #$34
00839   3E8   A1              MOV @R1, A        STO RSLT
00840   3E9   18              INC R0
00841   3EA   19              INC R1
00842   3EB   27              CLR A             START DIV HI BYTE
00843   3EC   A1              MOV @R1, A
00844   3ED   F0              MOV A, @R0
00845   3EE   47              SWAP A
00846   3EF   31              XCHD A, @R1
00847   3F0   C9              DEC R1
00848   3F1   61              ADD A, @R1
00849   3F2   57              DA A
00850   3F3   A1              MOV @R1, A        STO RSLT
00851   3F4   83              RET
00852   3F5   C5      SHIFT   SEL RB0           REGISTER BANK
00853   3F6   FF              MOV A, R7         GET CONTR REG
00854   3F7   D3 20           XRL A, #$20       CPL RNGE FLG
00855   3F9   43 40           ORL A, #$40       SET SHFT FLG
00856   3FB   AF              MOV R7, A         SET CONTR REG
00857   3FC   D5              SEL RB1           REGISTER BANK
00858   3FD   83              RET
00859   3FE   00              NOP
00860   3FF   00              NOP
00861                 *
00862                 *
00863                 *****TRACY LINWOOD VARNUM*****
00864                 *    10/25/78
00865                 *    VERSION 2*0
00866                 *    COPYRIGHT 1978
00867                 *    CASPAR INTEGRATED SYSTEMS
00868                 *
00869                 *
```

SYMBOL TABLE

| | | | | | | | |
|---|---|---|---|---|---|---|---|
| CKMOD | 015 | GOLTCH | 02C | GODT/M | 030 | MINRCL | 034 |
| MAXRCL | 038 | INDIC | 03B | TRVOK | 041 | START | 043 |
| PREX | 04A | INFO | 04D | FLGP | 058 | INP2 | 059 |
| RPT | 05E | VALX | 062 | CMBK | 066 | CPLR0 | 06B |
| STCPL | 077 | DRET | 079 | LKHI | 07B | TRVLD | 084 |
| 3EOC | 090 | EOCSK | 094 | EOC | 096 | DECR2 | 09A |

| | | | | | | | |
|---|---|---|---|---|---|---|---|
| DECR | 09E | SUB2B | 0A1 | SRET | 0AB | INCRT | 0AC |
| UPDMM | 0B0 | LTCHMM | 0B5 | LTCHST | 0BF | CPMIN | 0C5 |
| CPMAX | 0CD | LTCHPL | 0D1 | CMPRV | 0D2 | OLD | 0D8 |
| MORE | 0D9 | NEW | 0DC | STNEW | 0E3 | STMAX | 0E7 |
| STLTCH | 0EB | SETUP | 0EF | TCPLMT | 0F7 | MOV10 | 0FE |
| IDATA | 105 | WLOOP | 106 | ENTER | 10A | INPT | 119 |
| SHFTU | 11D | GOOVFL | 125 | OKRGE | 129 | PACK | 138 |
| CKDEC | 13C | MIN30 | 143 | PMOVF | 14B | TSTRGE | 151 |
| SHFTD | 159 | LINR | 163 | ADD6 | 17F | TADDR | 185 |
| UNMSK | 192 | STO2 | 195 | STODIF | 19F | DOWN | 1A2 |
| ADR00 | 1A7 | ADR51 | 1B1 | ADR09 | 1BC | 2DIFF | 1C6 |
| IRETR | 1C9 | INTRP | 1CA | TIMES | 1D7 | READY | 1DD |
| ADDDF | 1E3 | OFFBR | 1E5 | USE2 | 1EF | MOV01 | 1F4 |
| ADDOF | 1FB | STOH | 20A | CARR1 | 20D | INCTH | 211 |
| LATCH | 216 | SIGCK | 226 | UPWRD | 23F | SIG | 241 |
| SIGYS | 24C | ROLL | 24E | MMCK | 260 | DECRT | 264 |
| EXIT | 267 | RQOK | 26B | OVFL | 26C | HIGH | 275 |
| DBLST | 277 | CPOVF | 27F | ORET | 28D | LLOOP | 28E |
| WTRET | 298 | DT/M | 29C | REGO | 2A6 | COUNT | 2B9 |
| FLGOK | 2CA | CKR7 | 2D4 | RIGHT | 2D7 | DTOUT | 2E7 |
| ADJST | 2F1 | TABLE | 301 | OUT | 33D | SCALE | 356 |
| OUTC | 35C | CNT2 | 363 | DIG | 365 | DELAY | 36D |
| PSIGN | 37E | GROUP | 381 | OUTF | 384 | ADDF | 398 |
| END | 39A | OUTK | 39F | ADDK | 3AF | ADD2B | 3B3 |
| DIVL | 3BF | DRTRS | 3CE | 1*8R1 | 3CF | CMPT2 | 3D9 |
| DIV10 | 3E3 | SHIFT | 3F5 | | | | |

HARDWARE COMPONENTS

Referring to FIGS. 2–4, the following tables give standard commercial designations or electrical nomenclature and values for the components shown in the respective Figures.

TABLE I
(FIG. 2)

| Designation in Figure | Description |
|---|---|
| R1 | Resistor, 2.49k ohm |
| R2,8 | Resistors, 10k ohm |
| R3 | Resistor, 3.4k ohm |
| R4 | Resistor, 1.47k ohm |
| R5, 7, 12 | Resistors, 8.45k ohm |
| R6 | Resistor, 100k ohm |
| R9, 11 Trimpots | Resistors, 1k ohm |
| R10 | Resistor, 11k ohm |
| R13 | Resistor, 2.7k ohm |
| A1-4 | LM324 |
| A5 | CA3160 |
| Q1 | Transistor, 2N3905 |
| C1 | Capacitor, .47micro F |
| Sensor, platinum | Din Std. .00385ohm/ohm/°C. 100 ohm ± .1 ohm @ 0.0° C. |

TABLE II
(FIG. 3)

| Designation in Figure | Description |
|---|---|
| IC1 | Integ. Cir. MC1403U |
| IC4 | ADC3711CCN |
| IC5 | Intel 8048 |
| X1 | Crystal, 2.903 MHz |
| C2 | Capacitor, .01 microF |
| C3,4 | Capacitor, .47 microF |
| C5 | Capacitor, 10 microF |
| C6,7 | Capacitor, 20 pF |
| C8 | Capacitor, 2.2 microF |
| R14 | Resistor, 2.49k ohms |
| R15 | Trimpot, 1k ohm |
| R16 | Resistor, 11.8k ohm |
| R17 | Resistor, 100k ohm |
| R18 | Resistor, 1.5k ohm |
| R19 | Resistor, 10k ohm |

TABLE III
(FIG. 4)

| Designation in figure | Description |
|---|---|
| IC6 | Integ. Cir. DF411CJ |
| IC7 | MC 14070B |
| IC8 | CA3290 |
| IC9 | LM340H-5.0 |
| LXD Display | LXD 45D5R03 |
| D1 | Diode, 1N4001 |
| C9, 10 | Capacitors, 10 microF |
| C11 | Capacitor, 390 pF |
| R20 | Resistor, 10.4k ohm |
| R21, 22 | Resistors, 10k ohm |

OPERATION

In use, the instrument is powered by either internal storage cells or an external plug-in AC/DC adaptor. When operating on dry cell power, a low battery indication will automatically appear, comprising the displaying of decimal points between each digit of the display, should the batteries become depleted.

Application of power to the instrument, selection of operating modes, and selection of recall or conversion functions is achieved by user manipulation of the front-panel switches shown in FIG. 8.

FIG. 8 shows a front panel view of one embodiment of the invention. Shown in this view are the display, the rocker switches used to communicate scale, mode, and recall requests to the microcomputer, a slide switch used to turn power to the instrument on and off, and a connector for a sensor, shown in the lower left-hand corner of the panel.

Calibration of the instrument is achieved in the following manner: (while operating in the Continuous mode)

- the sensor is subjected to a known temperature of 0.0° C. and the ZERO trimpot R9 of FIG. 2 is so adjusted so that the display shows 0.0° C.
- next, the sensor is subjected to a known temperature of 100.0° C. and the GAIN trimpot R15 of FIG. 3 is adjusted to obtain that reading in the display. Two or three iterations of these first two steps will be necessary in order to achieve best calibration as these two adjustments are not entirely independent,
- finally, the sensor is subjected to a known temperature above 170° C. by means of a constant-temperature oil bath or similar device and the OFFSET trimpot R11 of FIG. 2 is adjusted so that the proper reading is displayed.

In the foregoing a preferred embodiment of the invention has been described; however, it will be understood that there is no intent to limit the invention by such disclosure, and that it is intended to cover any and all other embodiments falling within the scope of the following claims:

We claim:

1. An electronic thermometer comprising a resistance temperature detector, a source of constant current, means for connecting said source of constant current in electrical communication with said detector, amplifier means, means for connecting said amplifier means in electrical communication with said detector, analog to digital converter means, means for connecting said amplifier means in electrical communication with said analog to digital converter means, microcomputer means, means for connecting said microcomputer means in electrical communication with said analog to digital converter means, display means, means for connecting said display means in electrical communication with said microcomputer means;

wherein the improvement comprises voltage offset means for applying a predetermined voltage to said amplifier means, means for connecting said voltage offset means in electrical communication with said microcomputer means, means for control of said voltage offset means by said microcomputer means, means for representation of application of said voltage to said amplifier as a temperature differential by said microcomputer means for purposes of increasing the number of bits of information resolved by said analog to digital converter means.

* * * * *